United States Patent
Hu et al.

(10) Patent No.: US 11,405,924 B2
(45) Date of Patent: Aug. 2, 2022

(54) COMMUNICATION INTERFERENCE MITIGATION SYSTEMS AND METHODS

(71) Applicant: MediaTek Singapore Pte. Ltd., Solaris (SG)

(72) Inventors: Shengquan Hu, San Jose, CA (US); Jianhan Liu, San Jose, CA (US)

(73) Assignee: Mediatek Singapore Pte. Ltd., Singapore (SG)

( * ) Notice: Subject to any disclaimer, the term of this patent is extended or adjusted under 35 U.S.C. 154(b) by 83 days.

(21) Appl. No.: 16/206,930

(22) Filed: Nov. 30, 2018

(65) Prior Publication Data

US 2019/0182842 A1 Jun. 13, 2019

Related U.S. Application Data

(60) Provisional application No. 62/596,149, filed on Dec. 8, 2017.

(51) Int. Cl.
| | |
|---|---|
| *H04L 5/00* | (2006.01) |
| *H04W 72/08* | (2009.01) |
| *H04L 27/26* | (2006.01) |
| *H04W 84/12* | (2009.01) |

(52) U.S. Cl.
CPC ......... *H04W 72/082* (2013.01); *H04L 5/0007* (2013.01); *H04L 5/0042* (2013.01); *H04L 5/0046* (2013.01); *H04L 5/0048* (2013.01); *H04L 5/0066* (2013.01); *H04L 27/2626* (2013.01); *H04W 72/085* (2013.01); *H04W 84/12* (2013.01)

(58) Field of Classification Search
CPC .. H04L 1/0069; H04L 1/0068; H04W 52/244; H04W 72/082; H04J 11/003; H04J 11/0053
See application file for complete search history.

(56) References Cited

U.S. PATENT DOCUMENTS

| | | | |
|---|---|---|---|
| 2004/0264362 A1* | 12/2004 | Rhodes | H04L 27/2618 370/208 |
| 2010/0009710 A1* | 1/2010 | Zhang | H04W 52/241 455/522 |
| 2017/0041171 A1* | 2/2017 | Li | H04L 5/0053 |
| 2018/0302858 A1* | 10/2018 | Son | H04L 1/00 |

(Continued)

FOREIGN PATENT DOCUMENTS

| | | |
|---|---|---|
| CN | 101820311 A | 9/2010 |
| EP | 3396925 A2 | 12/2016 |

(Continued)

OTHER PUBLICATIONS

Hongyuan Zhang et al., BW Field in HE-MU Format, doc.:IEEE 802.11-16/0898, Jul. 25, 2016, pp. 1-19, XP068107210.

*Primary Examiner* — Abdelillah Elmejjarmi

(57) ABSTRACT

Presented systems and methods facilitate efficient and effective communication interference mitigation. In one embodiment, a method comprises: configuring a payload portion of information in a normal transmission sub-channel; puncturing information in a punctured sub-channel; adjusting a mitigation sub-channel use to mitigate interference associated with the punctured sub-channel; and transmitting the information in the normal transmission sub-channel, the punctured sub-channel, and the mitigation sub-channel.

21 Claims, 21 Drawing Sheets

(56) References Cited

U.S. PATENT DOCUMENTS

2019/0007180 A1* 1/2019 Shi .................. H04L 5/0051
2019/0141570 A1* 5/2019 Verma ............... H04L 5/0007
2019/0199491 A1* 6/2019 Verma ............ H04W 72/0453

FOREIGN PATENT DOCUMENTS

| WO | 2017/111567 A2 | 6/2017 |
| WO | 2017111567 A2 | 6/2017 |

* cited by examiner

COMMUNICATION INTERFERENCE MITIGATION SYSTEMS AND METHODS

CROSS-REFERENCE TO RELATED APPLICATIONS

This application claims benefit of and priority to U.S. Provisional Patent Application No. 62/596,149, entitled "Interference Avoidance and Mitigation Transmission Schemes in Wireless LAN", filed on Dec. 8, 2017, which is incorporated herein by reference.

FIELD OF THE INVENTION

Embodiments of the present invention relate to the field of network communications. In one embodiment, systems and methods facilitate efficient communication in a local area network environment.

BACKGROUND

Numerous electronic technologies such as digital computers, video equipment, and telephone systems are used to increase productivity and reduce costs in processing information in most areas of business, science, and entertainment. The electronic systems often utilize a number of methods to convey information including audio, video, graphics, and so on. Accurate and clear communications of information are typically important for proper processing and utilization of the information. However, there are a number of factors that can impact accurate communications of information, including interference.

Information is often communicated via various types of signals. Many systems utilize carrier waveforms modulated with an input signal, and the modulation process typically produces narrow sideband frequency signals (above and below the carrier frequency) that are used to convey the information. The sidebands can be associated with a sub-channel. It is appreciated that there can be various types of modulation (e.g., frequency modulation, amplitude modulation, spread spectrum, OFDM, etc.). Some traditional approaches include encoding information on multiple carrier or subcarrier frequencies that are communicated in sub-channels. However, sidebands or sub-channels can detrimentally interfere with signals in adjacent sub-channels.

SUMMARY

Presented systems and methods facilitate efficient and effective communication interference mitigation. In one embodiment, a method comprises: configuring a payload portion of information in a normal transmission sub-channel; puncturing information in a punctured sub-channel; adjusting a mitigation sub-channel use to mitigate interference associated with the punctured sub-channel; and transmitting the information in the normal transmission sub-channel, the punctured sub-channel, and the mitigation sub-channel. The punctured sub-channel can be a preamble punctured sub-channel. The information can included in a physical layer convergence procedure (PLCP) protocol data unit (PPDU). In one embodiment, the sub-channel is a punctured sub-channel. In one embodiment, a power level of the mitigation sub-channel is altered.

The adjusting/alteration of the mitigation sub-channel characteristic can include reducing a power level of the mitigation sub-channel. The adjusting/alteration of the mitigation sub-channel power level can be based upon a measured signal strength of a transmission in the punctured sub-channel. The adjusting/alteration of or of the mitigation sub-channel power level can be based upon a measured bandwidth of a transmission in the punctured sub-channel. The adjusting/alteration can include not using a mitigation sub-channel for a communication transmission. In one exemplary implementation, the mitigation sub-channel or sub-carrier is adjacent or close to a boundary of the punctured sub-channel. The adjusting/alteration of the mitigation sub-channel includes de-amplification on a mitigation sub-channel close to the channel boundary of the punctured sub-channel. In one exemplary implementation, the de-amplification can enable control of an interference leakage in accordance with a transmit spectral mask defined for a punctured scenario.

In one embodiment, the information is transmitted on a wireless communication link. The wireless communication link can be an IEEE 802.11 compatible communication link. The communication transmission can be configured in accordance with an Orthogonal Frequency-Division Multiple Access (OFDMA) scheme.

In one embodiment, the normal transmission sub-channel, the punctured sub-channel, and the mitigation sub-channel are included in a sub-channel scheme. The sub-channels can be resource unit sub-channels. The sub-channels can be arranged in accordance with various configurations (e.g., included in a group of 26 tone resource unit sub-channels, included in a group of 52 tone resource unit sub-channels, etc.). It is appreciated the presented systems and methods are compatible with various bandwidths (BWs) and allocation of resource unit combinations.

In one embodiment a system comprises: a first communication device that forwards information in a communication transmission. The communication transmission includes: a normal transmission sub-channel that conveys normal information; a punctured sub-channel that removes some of the information in a punctured sub-channel; and a mitigation sub-channel in which a characteristic is altered to mitigate interference associated with punctured sub-channel, and the mitigation sub-channel can be included in sub-channel scheme and the mitigation sub-channel is adjacent to the punctured sub-channel. The communication transmission can be configured in accordance with an Orthogonal Frequency-Division Multiple Access (OFDMA) scheme.

In one embodiment, a power level of the mitigation sub-channel is altered. An alteration of the mitigation sub-channel power level can be based upon a measured signal strength of a transmission in the punctured sub-channel. An alteration of the mitigation sub-channel power level can based upon a measured bandwidth of a transmission in the punctured sub-channel. The normal transmission sub-channel, the punctured sub-channel, and the mitigation sub-channel include resource unit sub-channels. The normal transmission sub-channel, the punctured sub-channel, and the mitigation sub-channel can be included in various groups of tones (e.g. included in a group of 26 tone resource unit sub-channels, included in a group of 52 tone resource unit sub-channels, etc.). In one embodiment, the first communication device includes a digital baseband filter applied on the mitigation sub-channel to mitigate the interference leakage and meet a transmit spectral mask defined for punctured scenarios.

BRIEF DESCRIPTION OF THE DRAWINGS

The accompanying drawings together with the description are incorporated in and form a part of this specification.

They illustrate exemplary embodiments and explain exemplary principles of the disclosure. They are not intended to limit the present invention to the particular implementations illustrated therein. The drawings are not to scale unless otherwise specifically indicated.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinarily skilled in the art that the present invention may be practiced without these specific details. In other instances, well known methods, procedures, components, and circuits have not been described in detail as not to unnecessarily obscure aspects of the current invention.

Systems and methods of the present invention facilitate efficient and effective communications via a network. The systems and methods include protocols and procedures that facilitate mitigation of interference. Interference with communication transmission is one of the most important aspects of a network and can have a significant impact on communication performance. The presented communication systems and methods can flexibly facilitate robust communication of information, allowing improved communication link operation and performance. In one embodiment, the systems and methods are included in a wireless local area network (WLAN). It is appreciated that WLANs can come in a variety of configurations.

Figure 1:
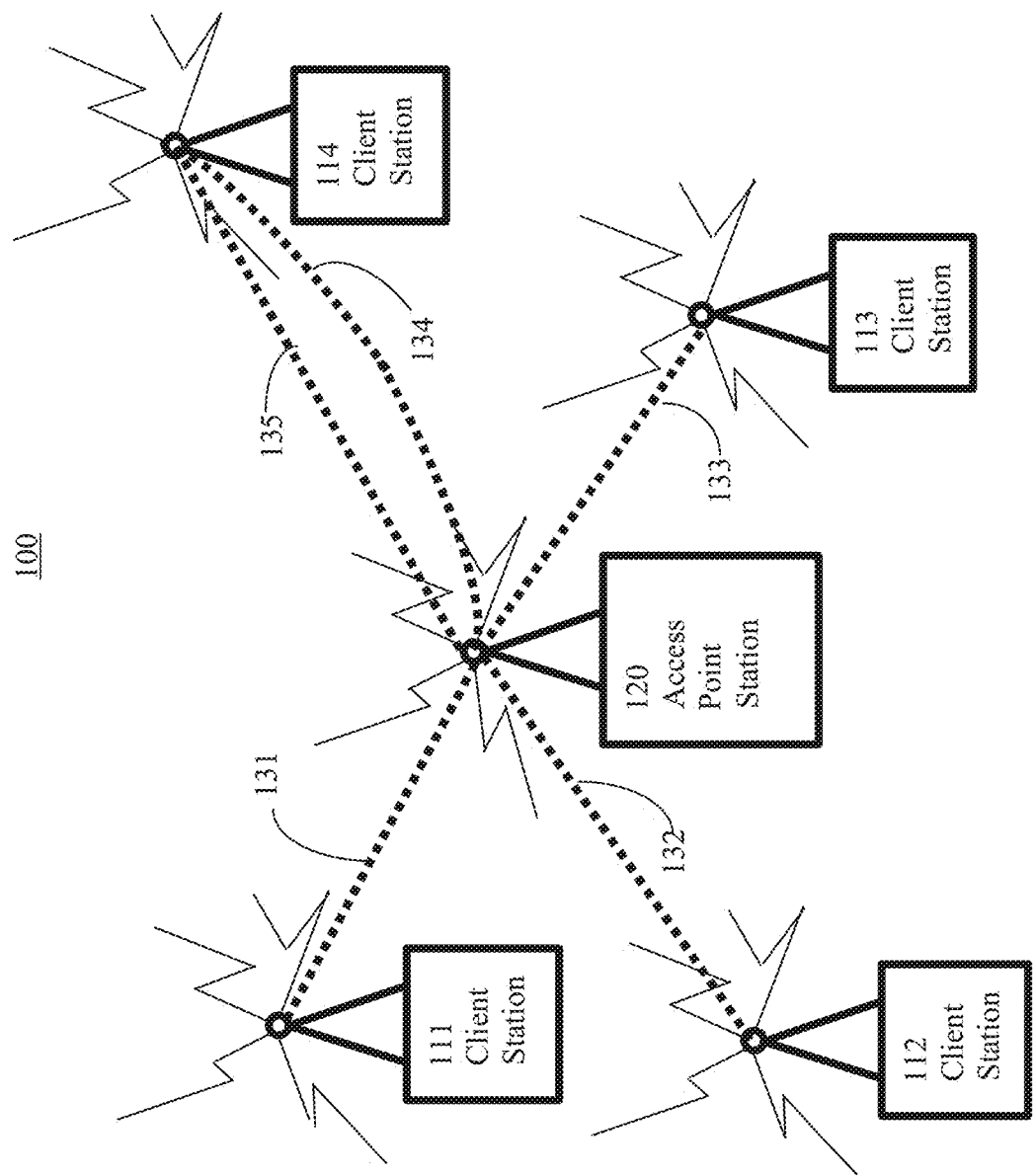
FIG. 1 is a block diagram of wireless local area network in accordance with one embodiment.

FIG. 1 is a block diagram of wireless local area network 100 in accordance with one embodiment. Wireless local area network 100 includes access point station 120 and client stations 111, 112, 113, and 114. In one embodiment, wireless communications links 131, 132, 133, can be established between access point station 120 and client stations 111, 112, and 113 respectively. Client station 114 can be communicatively coupled to access point station 120 via a plurality of communication links, including communication links 134 and 135. The communication links can have different features, characteristics, and conditions that are mapped to different modulation, coding, and other parameters for a respective communication link via link adaptation information. In one embodiment, an access point station can be a base station for the WLAN. Access point stations can include a wireless router, a wireless bridge, and so on. Client stations can include computers, tablets, cell phones, and so on. In one exemplary implementation, access point stations and client stations are Wi-Fi compatible. In one exemplary implementation, access point stations and client stations are IEEE802.11 compatible.

Figure 2:
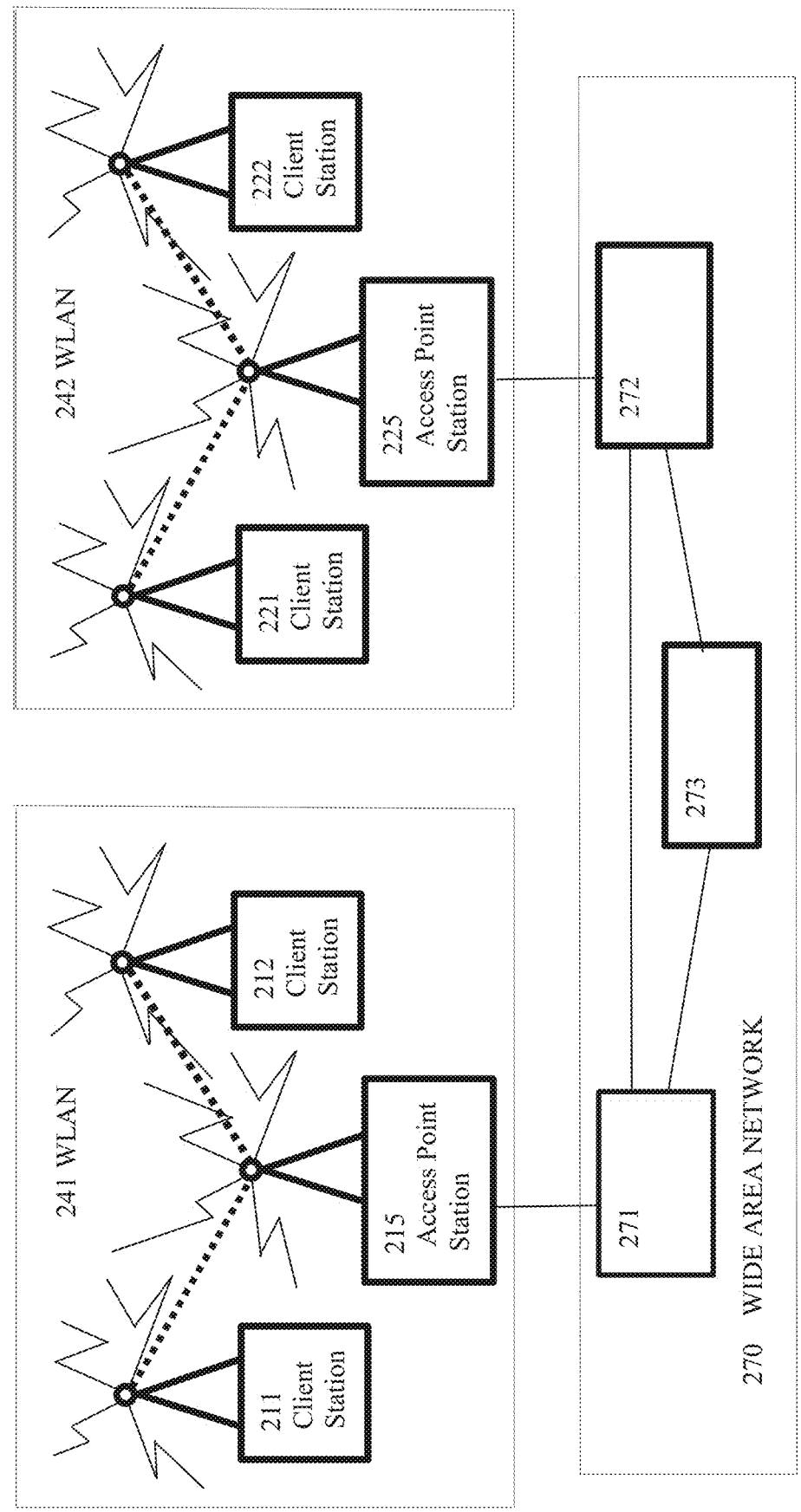
FIG. 2 is a block diagram of an exemplary communication network in which a WLAN is communicatively coupled to other communication components in accordance with one embodiment.

FIG. 2 is a block diagram of an exemplary communication network 200 in which a WLAN is communicatively coupled to other communication components in accordance with one embodiment. Communication system 200 includes WLAN 241, WLAN 242, and Wide Area Network (WAN) 270. WLAN 241 includes access point station 215 and client stations 211 and 212. Client stations 211 and 212 can be communicatively coupled to access point station 215. WLAN 242 includes access point station 225 and client stations 221 and 212. Client stations 221 and 222 can be communicatively coupled to access point station 225. WAN 270 includes components 271, 272, and 273 which can be communicatively coupled to each other. Access point station 215 can be communicatively coupled to component 271 and access point station 225 can be communicatively coupled to component 272. WAN 270 can be considered a wide area network backbone.

Figure 3:
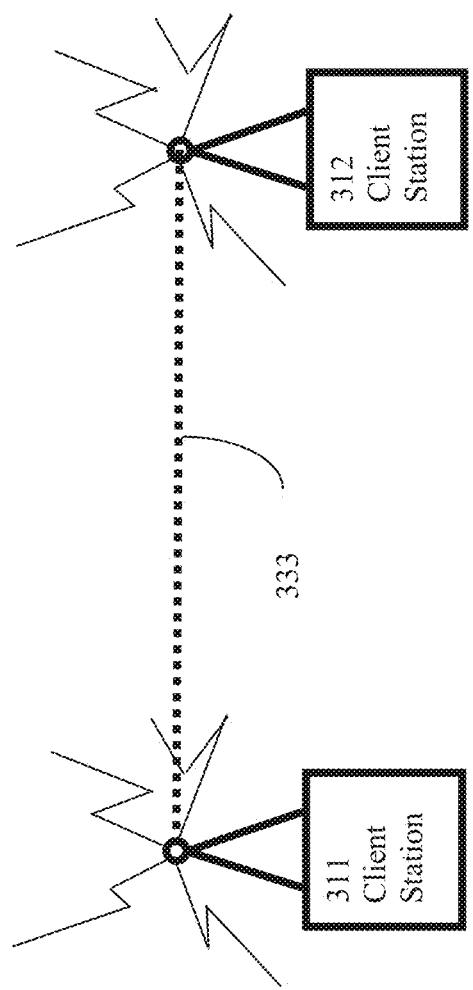
FIG. 3 is a block diagram of wireless local area network (WLAN) in accordance with one embodiment.

FIG. 3 is a block diagram of wireless local area network (WLAN) 300 in accordance with one embodiment. Wireless local area network 300 includes client stations 311 and 312 and can be communicatively coupled via communication link 333. In one embodiment, WLAN 300 is an ad hoc network in a peer to peer (P2P) configuration in which wireless device client stations 311 and 312 can communicate directly with each other. In one embodiment, wireless devices within range of each other can discover and communicate directly without involving intermediate dedicated central access points. In one exemplary implementation, an Independent Basic Service Set (IBSS) is utilized. In one embodiment, WLAN 200 is a Wi-Fi P2P compatible network in which one of the device stations is considered a group owner that operates as an access point and the other device stations are clients.

In one embodiment, information is communicated in data units (e.g., packets, frames, groups, sets, etc.) of information. The data units can comprise a designated size or number of bits. In one embodiment, a protocol compliant data unit (PDU) is utilized to communicate information that is transmitted as a single unit among entities at a protocol hierarchical peer level of a computer network. A PDU may contain network address indications (e.g., source, destination, etc.) and user data or control information. It is appreciated that PDUs can be utilized to communicate various types of information. In one embodiment, a PDU can include both basic payload information and network control information. Communication packets can include PDUs with a basic or primary payload directed to information a user wants to communicate from one client station to another client station (e.g., a document, an image, a video, other data, etc.). In one embodiment, a station sending or forwarding a PDU with basic payload information is considered a transmitter station and a station receiving the basic communication is considered a receiver client station.

In one embodiment, particular portions or sections of information in a PDU can be configured or organized in accordance with various fields. In one embodiment, media access control (MAC) information is utilized in the management of network link communication operations. It is appreciated MAC information can be communicated in a variety of ways, including in a PDU. The PDU can be compatible with data convergence characteristics. In one embodiment, the PDU is a physical layer convergence procedure (PLCP) protocol data unit (PPDU). In one exemplary implementation, a PLCP is utilized to minimize the dependence of the MAC layer on the physical medium dependent (PMD) layer by mapping MAC protocol data units (MPDUs) into a frame format suitable for transmission by the PMD. The PLCP can also map incoming frames from the PMD layer or wireless medium to the MAC layer.

Figure 4:
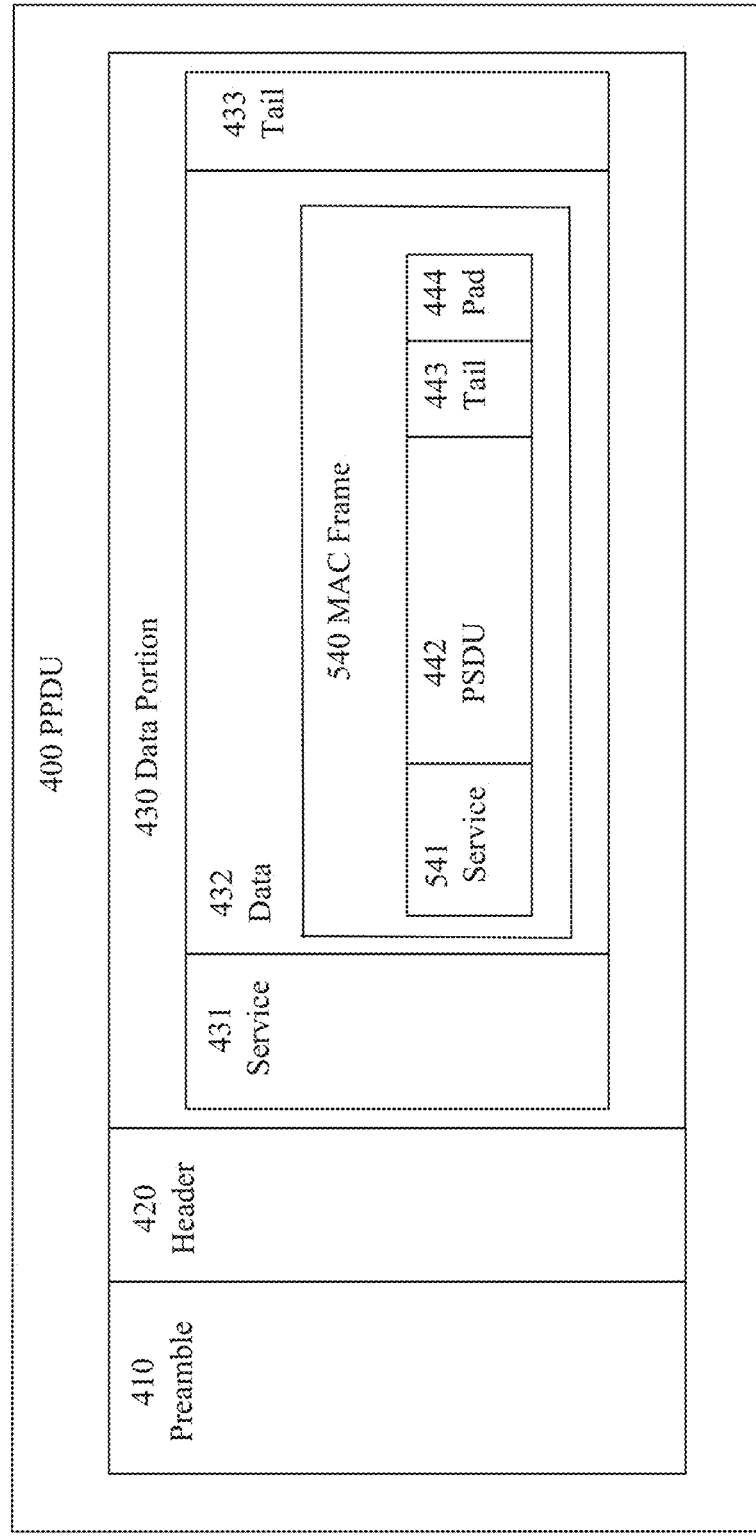
FIG. 4 is a block diagram of an exemplary PPDU in accordance with one embodiment.

FIG. 4 is a block diagram of an exemplary PPDU 400 in accordance with one embodiment. PPDU 400 includes a preamble portion 410, header portion 420, and a data portion 430. The preamble portion 410 can include format specific training and signaling fields. The header portion 420 can include destination, and source information. The data portion can include PLCP information. In one embodiment, the data portion 430 includes service field 431, data field 432, and tail 433 field. In one embodiment, data field 432 is a high throughput data field. Data field 432 includes a MAC frame 440 which includes a service field 441, PSDU field 442, tail field 443, and optional padding bits 444. In one embodiment, the PSDU is also called the MPDU.

Communications on a wireless communication link (e.g., a radio signal, electromagnetic signal, etc.) between components (e.g., client stations, access point stations, etc.) can be impacted by various factors and conditions. Conditions on the wireless link can include path loss, interference due to signals coming from other transmitters, the sensitivity of the receiver, the available transmitter power margin, and so on. Increasing density of signals in limited frequency bandwidths can also cause interference issues, often limiting the number of users that can effectively communicate.

In one embodiment, network communications are compatible with a multiple-user multiple-input multiple-output (MU-MIMO) configuration. In one exemplary implementation, orthogonal frequency division multiple access (OFDMA) facilitates transmissions with multiple users simultaneously while addressing some interference concerns. The OFDMA transmissions can include a high efficiency multi user (HE-MU) access. A symbol can be constructed of subcarriers where the total number defines a physical layer PDU bandwidth. In a multi-user (MU) network a user can be assigned different subsets of subcarriers or tones to achieve simultaneous data transmission. In one embodiment, subsets or groups of tone are referred to or identified as a resource unit (RU). The RUs enables an Access Point station to allow multi-users to access it simultaneously and efficiently. RUs can be used in both DownLink (DL) and UpLink (UL) transmissions. In one embodiment, RUs are assigned to each Channel Bandwidth (CBW) in accordance with the following table:

| RU Type | CBW 20 Mhz | CBW 40 MHz | CBW 80 MHz | CBW 80 + 80 MHz and CMW 160 MHz |
|---|---|---|---|---|
| 26-Tone-RU | 9 | 18 | 37 | 74 |
| 52-Tone-RU | 4 | 8 | 16 | 32 |
| 106-Tone-RU | 2 | 4 | 8 | 16 |
| 242-Tone-RU | 1 | 2 | 4 | 8 |
| 484-Tone-RU | NA | 1 | 2 | 4 |
| 996-Tone-RU | NA | NA | 1 | 2 |
| 2X996-Tone-RU | NA | NA | NA | 1 |

In the above example, a maximum of nine of the 26-tone RUs can be used in a basic 20 MHz bandwidth, but only a maximum of four of the 52 tone RUs can used in the basic 20 MHz bandwidth. Resource Units (larger than or equal to 106-tone RUs) can also enable multiple users to use multiple input/multiple output (MIMO) at the same time. With OFDMA, different transmit powers may be applied to different RUs. In one exemplary implementation, OFDMA can reduce sideband interference concerns.

Figure 5:
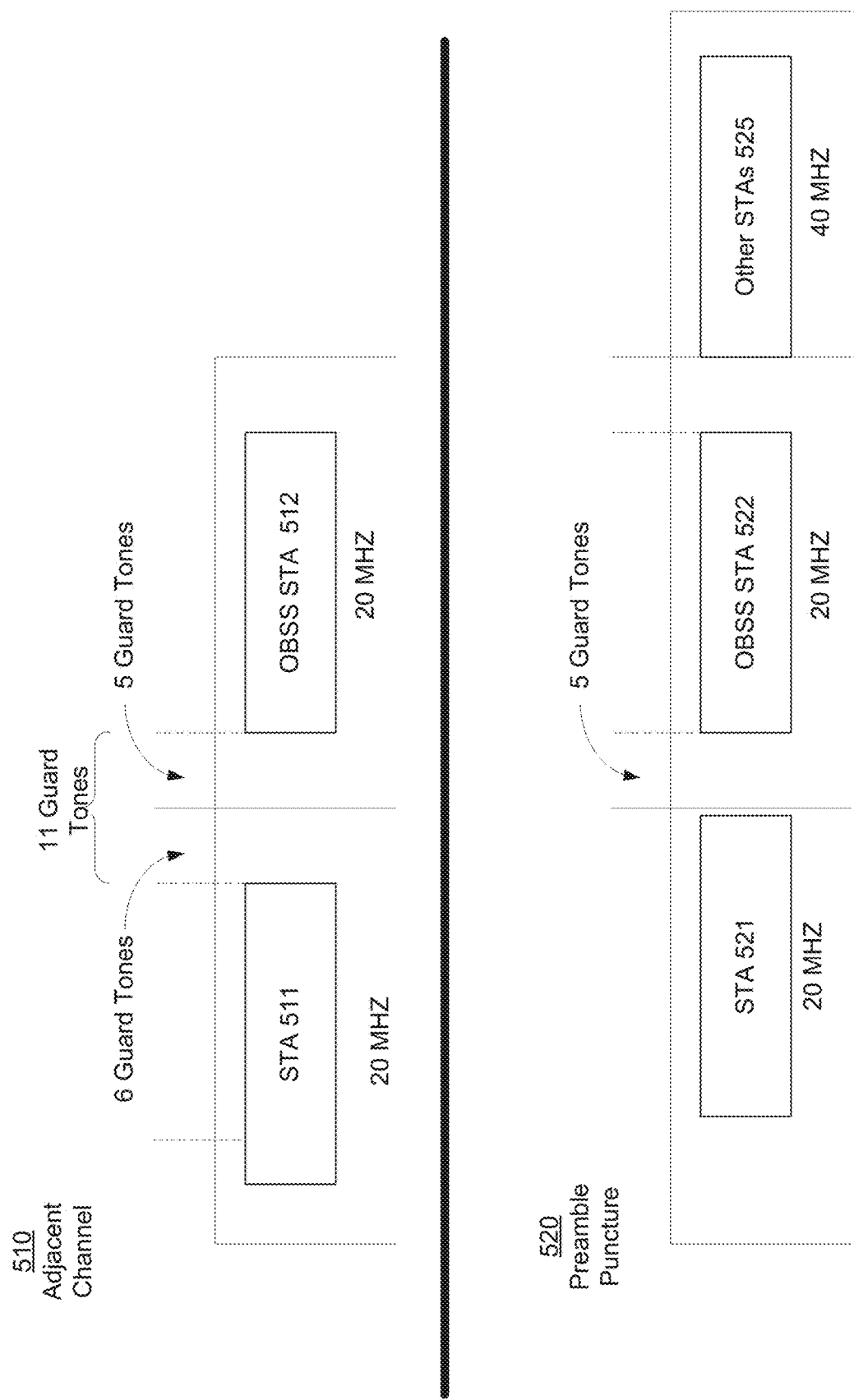
FIG. 5 is a block diagram comparison of a traditional ACI approach and an ideal preamble puncture approach in accordance with one embodiment.

It is appreciated that various mechanisms or approaches can be utilized to reduce interference issues. Traditional approaches for coping with adjacent channel interference (ACI) can include the introduction of guard bands between the adjacent channels. Unfortunately, each guard band inserted between channels basically wastes the guard band frequency and reduces the available bandwidth for communication transmission. In one embodiment, puncturing is implemented and typically requires or wastes less guard bands than traditional ACI approaches. In puncturing some bits of information are removed. In one exemplary implementation, preamble puncturing is implemented. FIG. 5 is a block diagram comparison of a traditional ACI approach 510 and an ideal preamble puncture approach 520 in accordance with one embodiment. As illustrated, in ACI approach 510 a 20 MHz transmission from station 511 includes 6 guard tones and a 20 MHz transmission from OBSS station 512 includes 5 guard tones for a total of 11 guard tones, whereas in preamble puncture approach 520 a 20 MHZ transmission from station 521 includes no guard tones and a 20 MHz OBSS transmission from station 522 includes 5 guard tone for a total of 5 guard tones. Preamble puncture side effect scenario 520 can include a 40 MHZ transmission from other stations 525. These guard tones are not included in the range of an individual RU sub-carrier. For example, in a 26 tone 20 MHz Channel, the guard tone frequencies are not included in the frequencies occupied by the corresponding 9 RU frequencies.

Preamble puncture can also facilitate enhanced spectral efficiency and frequency reuse. In one exemplary implementation of an 80 MHz transmission, a secondary 20 MHz can be the puncture sub channel and one of the two 20 MHz sub-channels in the secondary 40 MHZ can be the punctured sub-channel. In one exemplary implementation of a 160 MHz transmission, a secondary 20 MHz of the primary 80 MHz can be the punctured sub-channel, and a primary 40 MHz of the primary 80 MHz can be the punctured sub-channel. In one exemplary implementation of a 80 MHz plus 80 MHz transmission, a secondary 20 MHz of the primary 80 MHz can be the punctured sub-channel, and a primary 40 MHz of the primary 80 MHz can be the punctured sub-channel.

Figure 6:
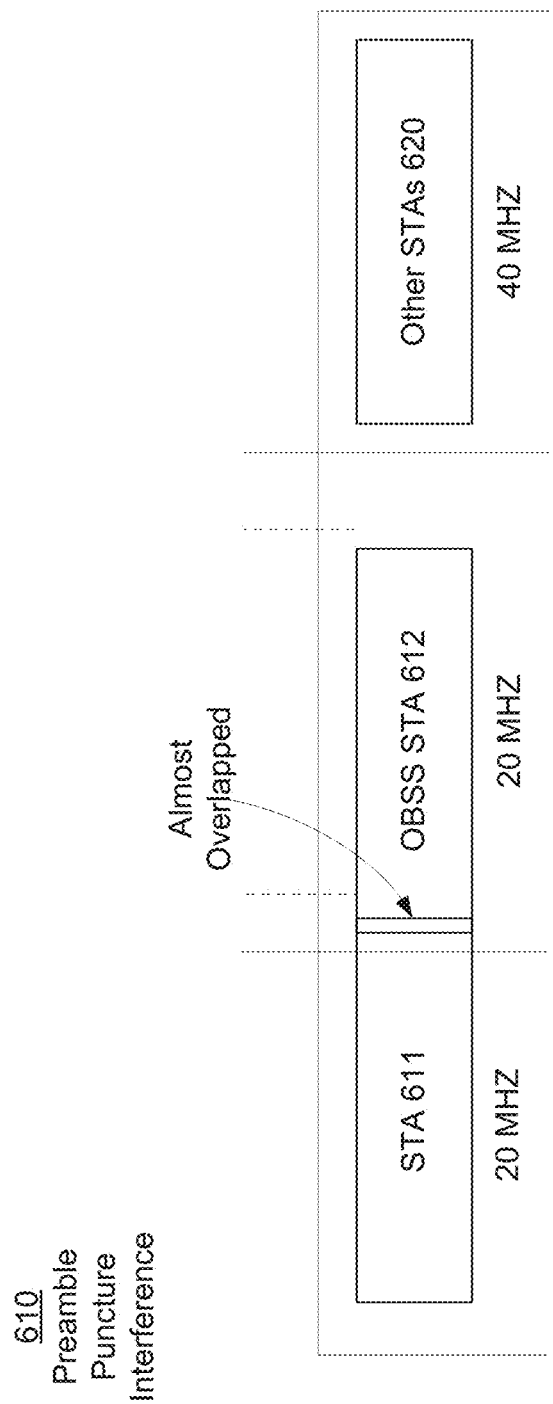
FIG. 6 is a block diagram of traditional preamble puncture side effect scenario of a frequency offset in accordance with one embodiment.

While puncture approaches can provide several benefits, real life implementations are not typically ideal and can introduce side effects. Conventional RU allocation in the preamble punctured transmission is very aggressive and there are no or very few protection/guard bands. In addition, various factors can have impacts on a communication transmission, including movement of transmitting/receiving, devices, and frequency mismatch between transmitter and receiver oscillators. These factors can lead to non-synchronization of punctured transmissions and associated sub-channels, carrier frequency offset (CFO), and impacts associated with Doppler effects. FIG. 6 is a block diagram of traditional preamble puncture side effect scenario 610 of a frequency offset in accordance with one embodiment. In one exemplary implementation including a 40 PPM frequency offset between two OBSSs, a preamble puncture can introduce very large interference because the tones from the two signals can almost overlap. As illustrated in preamble puncture approach 610, a 20 MHZ transmission from station 611 almost overlaps a 20 MHz transmission from OBSS station 522. Traditional preamble puncture side effect scenario 610 can include a 40 MHZ transmission from other stations 620.

In one embodiment, preamble puncture can help address some types of interference concerns while introducing other interference concerns. Transmission related leakage can cause interference to a preamble punctured portion of a transmission. In one embodiment, most of the leakage is caused by distortions from analog components (e.g., power amplification (PA) distortion, in phase/quadrature (IQ) imbalance, etc.). Traditionally, there is no filter applied to the preamble puncture transmission. In addition, other transmissions are not orthogonal (e.g., due to CFO, Doppler effects, etc.) which disrupts the OFDMA scheme and allows interference to be introduced. It is appreciated the interference can come from various sub-channels. The interference can come from a sub-channel used for transmission of a HE MU PPDU. In one exemplary implementation, the tone plan for HE MU PPDU in the preamble punctured transmission is different from HE SU PPDU in 20 MHz. The interference can come from a sub-channel associated with an Overlapping Basic Service Set (OBSS). The interference caused by preamble puncture transmission can be significant.

Figure 7:
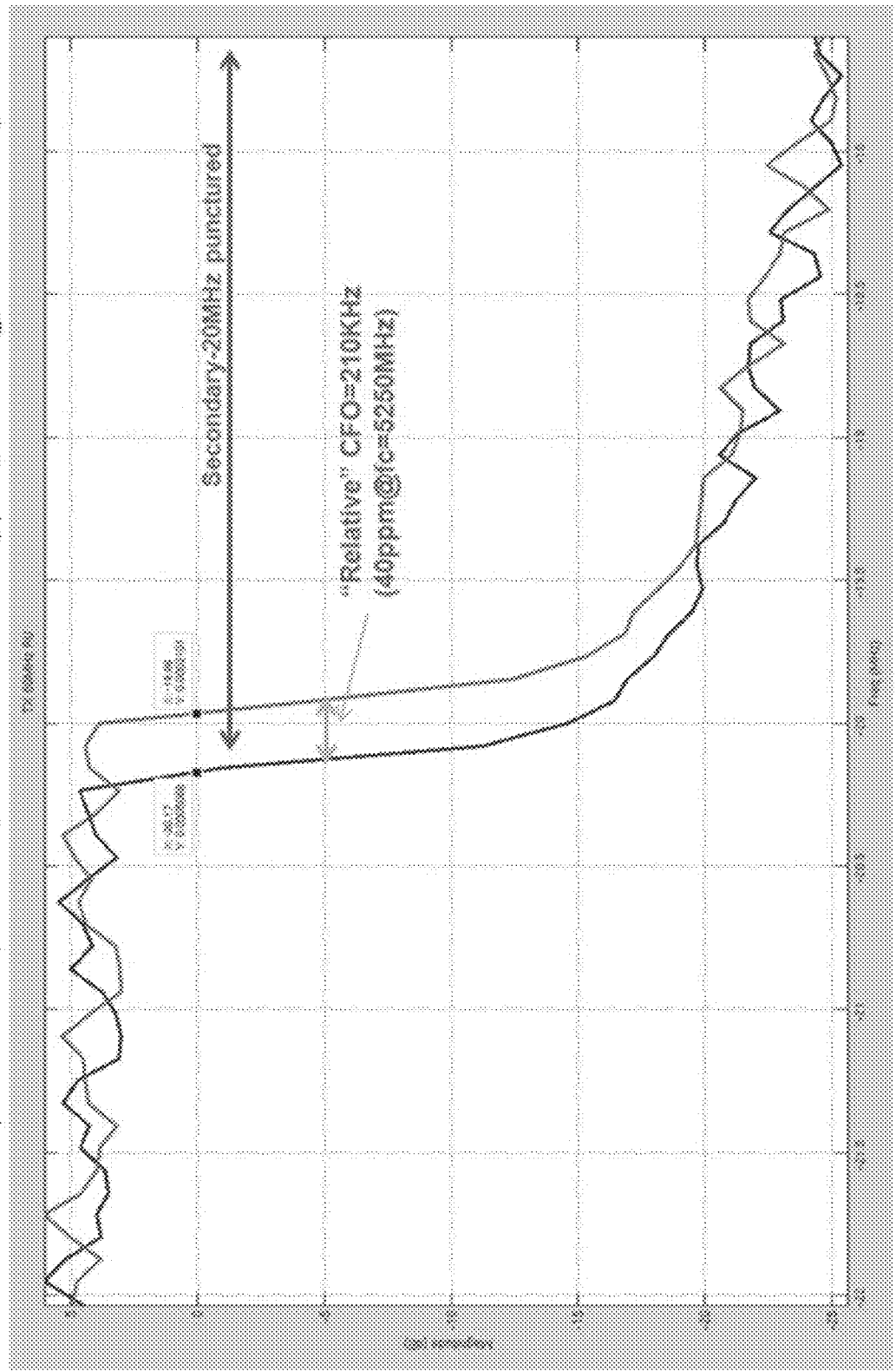
FIG. 7 is a graphical representation of puncture side effect interference with 40 ppm at carrier frequency of 5250 MHz in accordance with one embodiment.

FIG. 7 is a graphical representation of puncture side effect interference 700 with 40 ppm at carrier frequency of 5250 MHz in accordance with one embodiment. Puncture side effect interference 700 can be associated with a RU9 (e.g., in a 26-tone RU scheme, etc.) with a 40 PPM relative CFO. In one embodiment, a 40 PPM relative CFO includes 210 kHz @ fc=5250 MHz. As illustrated in FIG. 7, data tones in the punctured channel are affected by significant interferences. Conventional approaches do not typically provide efficient mitigation for these preamble puncture "side effect" interferences. For example, digital notch filters do not typically help with the preamble puncture "side effect" interferences. Clean OFDM signals typically decay much faster than OFDM signals with analog distortions and digital notch filters are not typically effective at reducing leakage caused by analog distortions. For a CFO situation the notch filter often needs to be very sharp and for overlapped situation the notch filter does not typically help at all.

Figure 8:
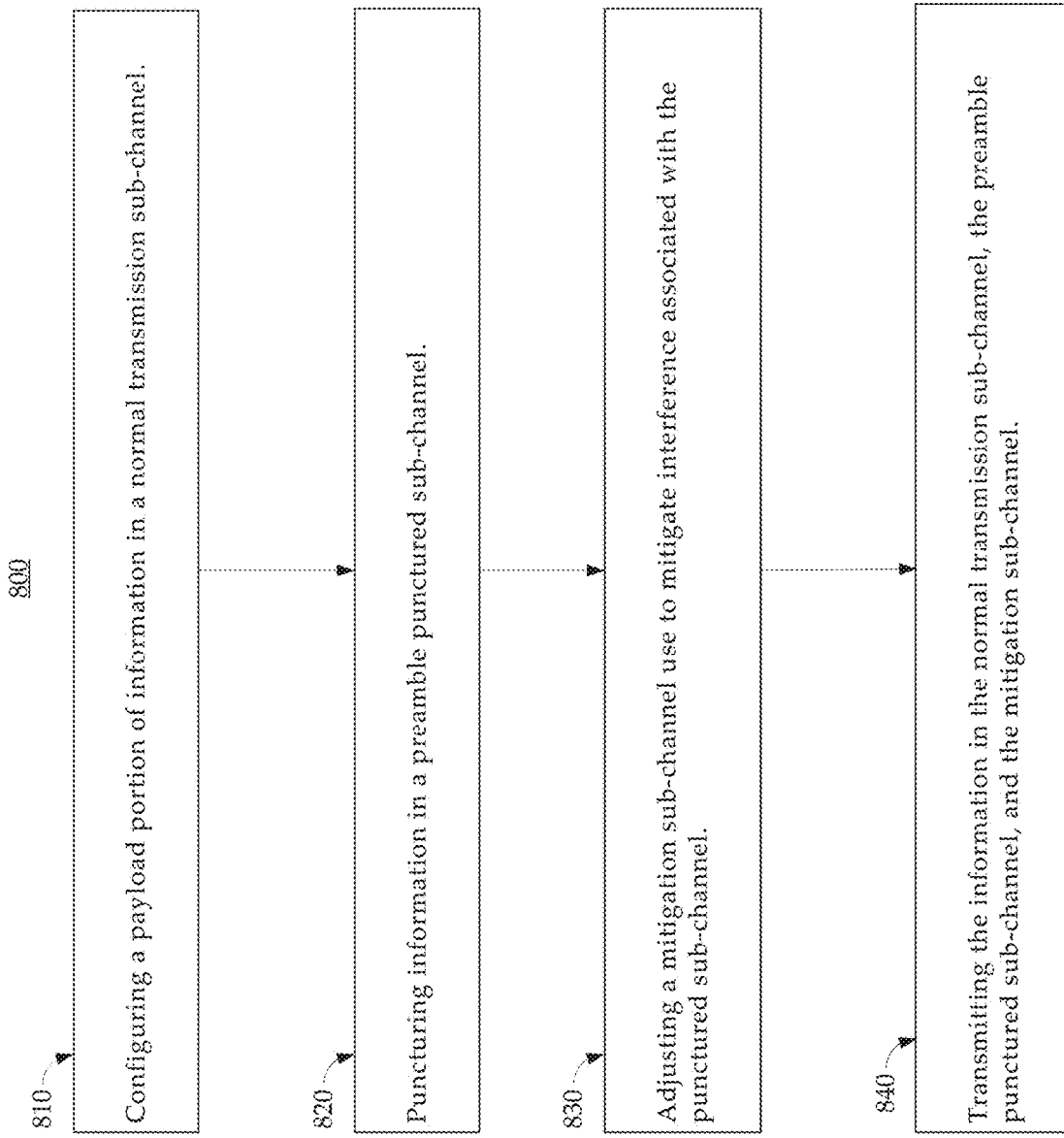
FIG. 8 is a flow chart of a puncture mitigation process in accordance with one embodiment.

In one embodiment, a puncture process is performed. In one embodiment, the puncture process is a puncture mitigation process. The puncture mitigation process can be a puncture side effect mitigation process that mitigates side effects of a puncture process, including mitigating interference. FIG. 8 is a flow chart of a puncture mitigation process in accordance with one embodiment.

In block 810, a payload portion of information in a normal transmission sub-channel is configured. The information can included in a physical layer convergence procedure (PLCP) protocol data unit (PPDU).

In block 820, information is punctured in a punctured sub-channel. In one embodiment, the sub-channel is a preamble punctured sub-channel.

In block 830, a mitigation sub-channel use is adjusted to mitigate interference associated with the punctured sub-channel. In one embodiment, a power level of the mitigation sub-channel is altered. The alteration of the mitigation sub-channel power level can be based upon a measured signal strength of a transmission in the punctured sub-channel. In one embodiment, the lower the signal strengths or power of a transmission in the punctured sub-channel, the smaller the amount of alteration or reduction of the mitigation sub-channel power level is needed. An alteration of the mitigation sub-channel power level can based upon a measured bandwidth of a transmission in the punctured sub-channel. In one embodiment, the narrower the bandwidth the less alteration of the mitigation sub-channel power level. The adjusting can include not using a mitigation sub-channel for a communication transmission. In one exemplary implementation, the mitigation sub-channel is adjacent to the punctured sub-channel.

In block 840, information in the normal transmission sub-channel, the punctured sub-channel, and the mitigation sub-channel is transmitted. In one embodiment, the information is transmitted on a wireless communication link. The wireless communication link can be an IEEE 802.11 compatible communication link. The communication transmission can be configured in accordance with an Orthogonal Frequency-Division Multiple Access (OFDMA) scheme.

In one embodiment, the normal transmission sub-channel, the punctured sub-channel, and the mitigation sub-channel are included in a sub-channel scheme. The sub-channels can be resource unit sub-channels. The sub-channels can be arranged in accordance with various configurations (e.g., included in a group of 26 tone resource unit sub-channels, included in a group of 52 tone resource unit sub-channels, etc.). It is appreciated the presented systems and methods are compatible with various bandwidths (BWs) and allocation of resource unit combinations.

Figure 9:
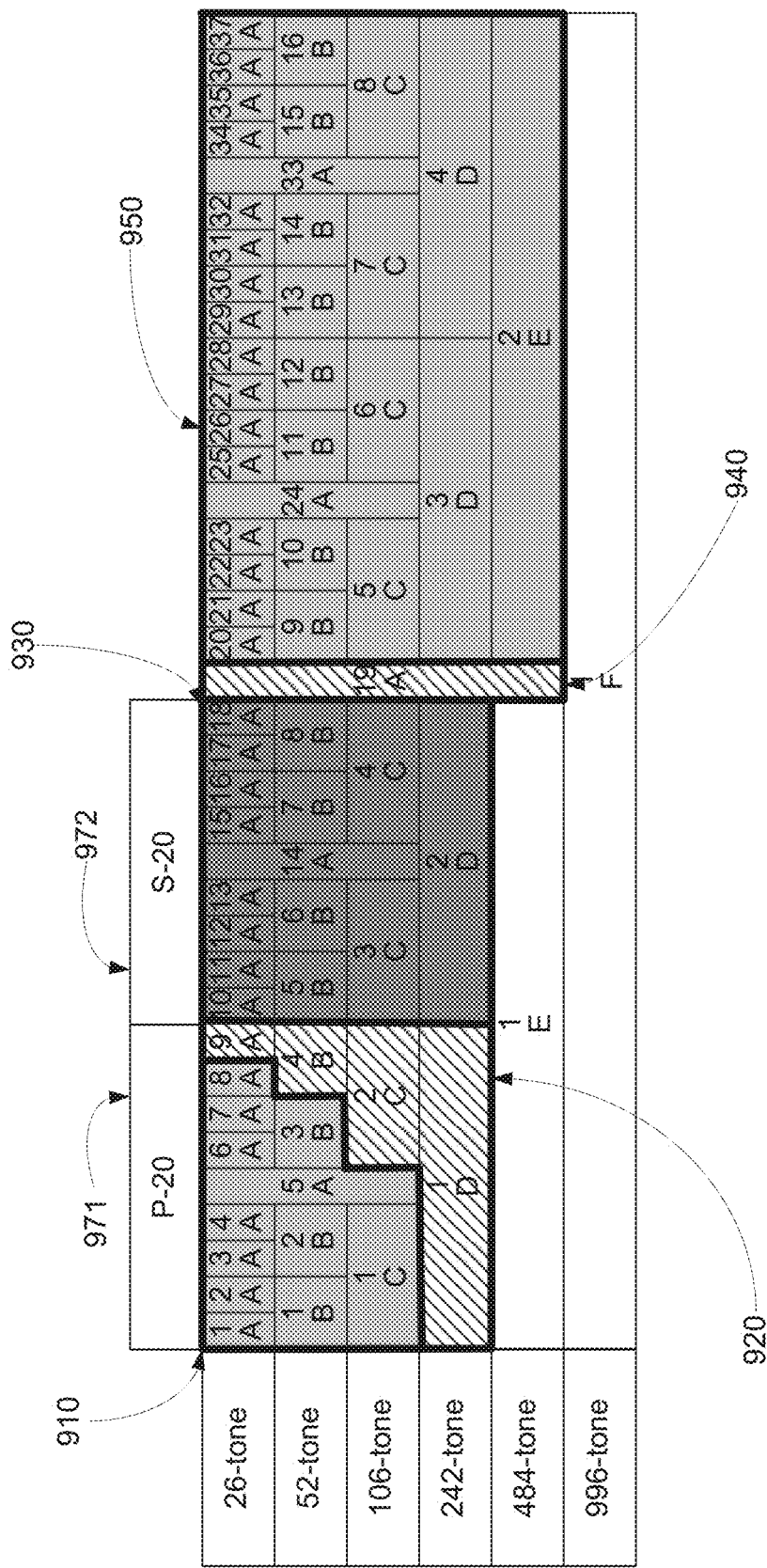
FIG. 9 is a block diagram of an exemplary resource unit allocation in accordance with one embodiment.

FIG. 9 is a block diagram of an exemplary resource unit allocation 900 in accordance with one embodiment. Exemplary resource unit allocation 900 includes normal sub-channel region 910 and 950, punctured sub-channel region 930, and punctured side effect mitigation sub-channel regions 920 and 940. In one embodiment, resource unit allocation 900 includes a primary 20 MHz region 971 and a secondary 20 MHz region 972. The punctured sub-channel region 930 can be associated with the secondary 20 MHz region S-20. The punctured sub-channel region 930 includes: RUs 10A, 11A, 12A, 13A, 14A, 15A, 16A, 17A, and 18A in the 26-tone configuration; RUs 5B, 6B, 14A, 7B, and 8B in the 52 tone configuration; RUs 3C, 14A, and 4C in the 106 tone configuration; and RU 2D in the 242 tone configuration. The normal sub-channel region 910 includes: RUs 1A, 2A, 3A, 4A, 5A, 6A, 7A, and 8A in the 26-tone configuration; RUs 1B, 2B, 5A, and 3B in the 52 tone configuration; RUs 1C and 5A in the 106 tone configuration. The punctured side effect mitigation sub-channel region 920 includes: RU 9A in the 26-tone configuration; RU 4B in the 52-tone configuration; RU 2C in the 106-tone configuration; and RU 1D in the 242-tone configuration. The punctured side effect mitigation sub-channel region 940 includes RU 19A in the 26-tone configuration, RU 19A in the 52-tone configuration, RU 19A in the 106-tone configuration, RU 19A in the 242-tone configuration, and RU 19A in the 484-tone configuration. The normal sub-channel region 950 includes: RUs 20A through 37A in the 26-tone configuration; RUs 9B through 16B, and 24A and 33A in the 52 tone configuration; RUs 5C, 23A, 6C, 7C 33A, and 8C 1A in the 106 tone configuration; RUs 3D and 4D in the 242 tone configuration; and RU 2E in the 484 tone configuration. RU 1E in the 484-tone configuration and RU 1F in the 996-tone configuration are unused.

In one embodiment, in a preamble portion before HE-STF, the transmit power needs to be reduced on those subcarriers contained in the frequency segment in RU 9 and RU 19. In one exemplary implementation, in the high efficiency short training field (HE-STF), high efficiency long training field (HE-LTF) and data portion, the transmit power needs to be reduced on all or partial of the sub-carriers contained in a frequency segment of a punctured side effect mitigation region. Alternatively, use of these RUs can be avoided or blocked in the preamble puncture transmissions.

Figure 10:
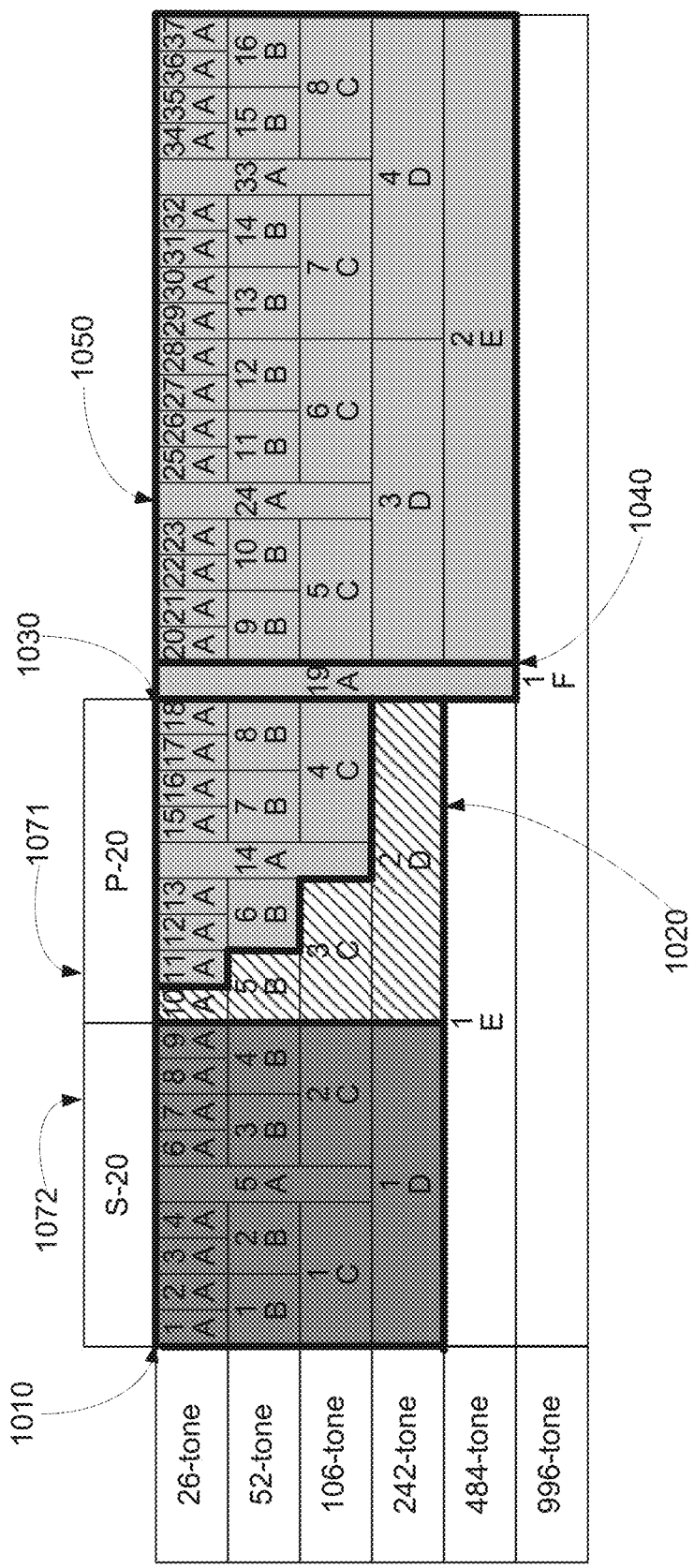
FIG. 10 is a block diagram of an exemplary resource unit allocation in accordance with one embodiment.

FIG. 10 is a block diagram of an exemplary resource unit allocation 1000 in accordance with one embodiment. Exemplary resource unit allocation 1000 includes punctured sub-channel region 1010, and punctured side effect mitigation sub-channel region 1020, and normal sub-channel region 1030. In one embodiment, resource unit allocation 1000 includes a primary 20 MHz region 1071 and a secondary 20 MHz region 1072. The punctured region 1010 includes RUs 1A through 9A in the 26-tone configuration, RUs 1B, 2B, 5A, 3B, and 4B in the 52-tone configuration, RUs 1C, 5A, and 2C in the 106-tone configuration, and RU 1D in the 242-tone configuration. The punctured side effect mitigation sub-channel region 1020 includes RU 10A in the 26-tone configuration, RU 5B in the 52-tone configuration, RU 3C in the 106-tone configuration, and RU 2D in the 242-tone configuration. The normal sub-channel region 1030 includes: RUs 11A through 37A in the 26-tone configuration; RUs 6B through 16B, and 14A, 19A, 24A and 33A in the 52 tone configuration; RUs 4C, 19A, 5C, 24A, 6C, 7C, 33A, and 8C 1A in the 106 tone configuration; RUs 19A, 3D and 4D in the 242 tone configuration; and RU 19A and 2E in the 484 tone configuration. RU 1E in the 484-tone configuration and RU 1F in the 996-tone configuration are unused.

Figure 11:
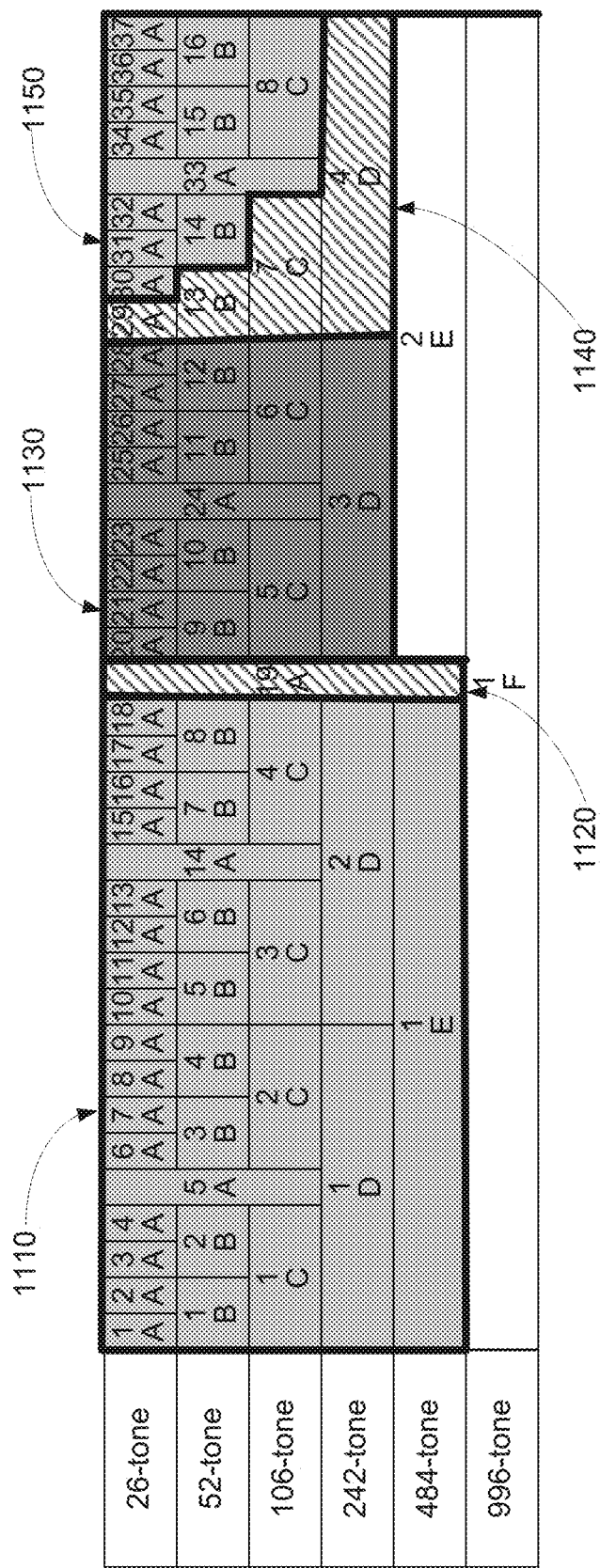
FIG. 11 is a block diagram of an exemplary resource unit allocation in accordance with one embodiment.

FIG. 11 is a block diagram of an exemplary resource unit allocation 1100 in accordance with one embodiment. Exemplary resource unit allocation 1100 includes normal sub-channel region 1110, punctured side effect mitigation sub-channel region 1120, punctured sub-channel region 1130, and punctured side effect mitigation sub-channel region 1140, and normal sub-channel region 1150. The normal sub-channel region 1110 includes: RUs 1A through 18A in the 26-tone configuration; RUs 1B through 8B, and 5A and 14A in the 52 tone configuration; RUs 1C through 4C, and 5A and 14A in the 106 tone configuration; RUs 1D and 2D in the 242 tone configuration; and RUs 1E in the 484 tone configuration. The punctured side effect mitigation sub-channel region 1120 includes RU 19A in the 26-tone configuration, RU 19A in the 52-tone configuration, RU 19A in the 106-tone configuration, and RU 19A in the 242-tone configuration. The punctured region 1130 includes RUs 20A through 28A in the 26-tone configuration, RUs 9B, 10B 24A, 11B and 12B in the 52-tone configuration, RUs 5C, 24A, and 6C in the 106-tone configuration, RU 3D in the 242-tone configuration. The punctured side effect mitigation sub-channel region 1140 includes RU 12A in the 26-tone configuration, RU 13B in the 52-tone configuration, RU 7C in the 106-tone configuration, and RU 2D in the 242-tone configuration. The normal sub-channel region 1150 includes: RUs 30A through 37A in the 26-tone configuration; RUs 14B, 33a, 15B, and 16B in the 52 tone 44D in the 242 tone configuration. RU 2E in the 484-tone configuration and RU 1F in the 996-tone configuration are unused.

Figure 12:
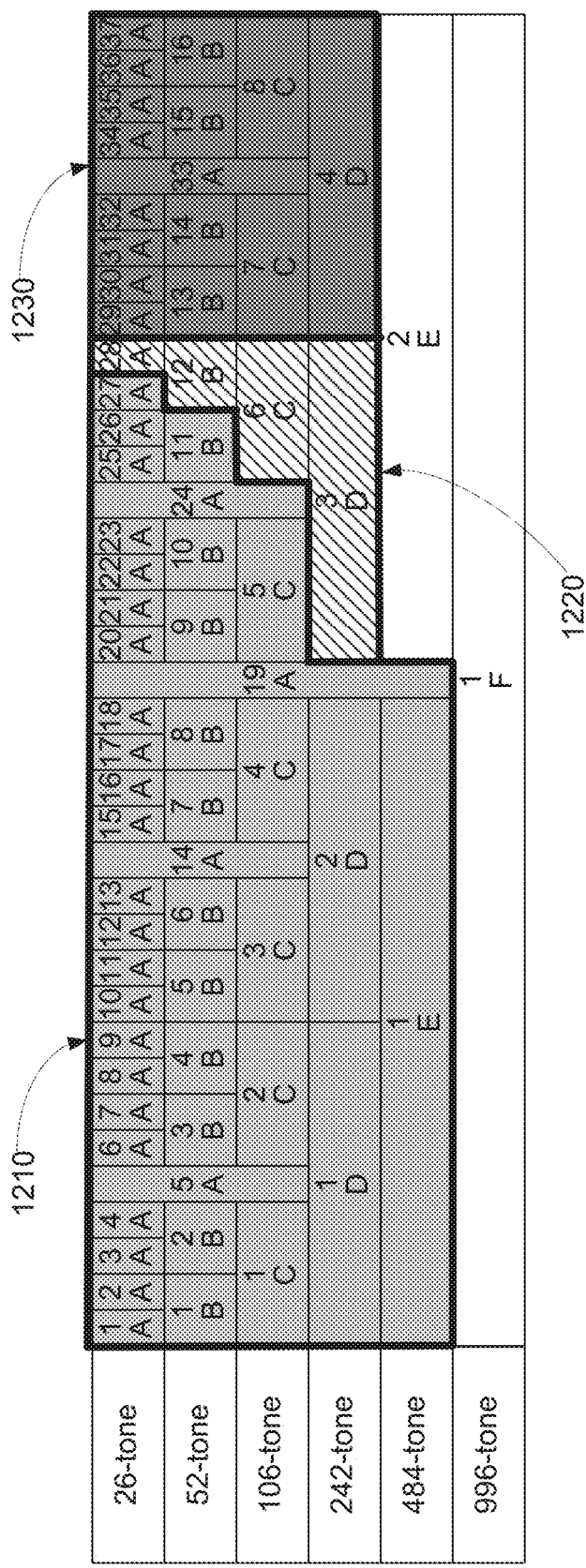
FIG. 12 is a block diagram of an exemplary resource unit allocation in accordance with one embodiment.

FIG. 12 is a block diagram of an exemplary resource unit allocation 1200 in accordance with one embodiment. Exemplary resource unit allocation 1200 includes normal sub-channel region 1210, and punctured side effect mitigation sub-channel region 1220, and punctured sub-channel region 1230. The normal sub-channel region 1210 includes: RUs 1A through 27A in the 26-tone configuration; RUs 1B, through 11B, 5A, 14A, 19A, and 24A in the 52 tone configuration; RUs 1C through 5C, 5A, 14A, 19A, and 24A in the 106 tone configuration, and RU 1 and 2D in the 106 tone configuration. The punctured side effect mitigation sub-channel region 1220 includes RU 28A in the 26-tone configuration, RU 12B in the 52-tone configuration, RU 6C in the 106-tone configuration, RU 3D in the 242-tone configuration. The punctured sub-channel region 1230 includes: RUs 29A through 37A in the 26-tone configuration; RUs 13B, 14B, 33A, 5B and 16B in the 52 tone configuration; RUs 3C, 33A, 4C in the 106 tone configuration; RU 4D in the 242 tone configuration. RU 3E in the 484-tone configuration and RU 1F in the 996-tone configuration are unused.

Figure 13:
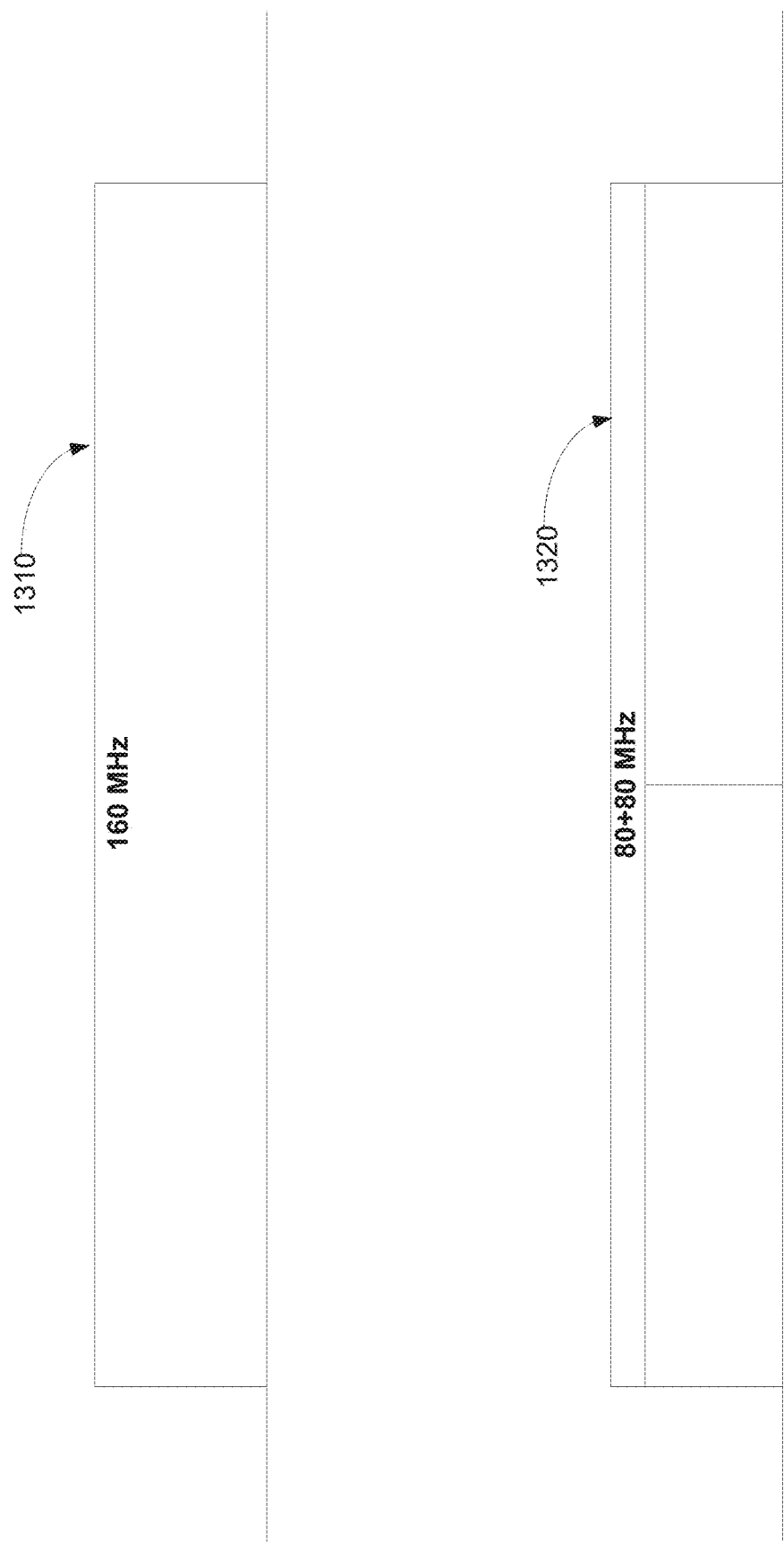
FIG. 13 is a block diagram of exemplary resource unit allocations in accordance with one embodiment.

FIG. 13 is a block diagram of exemplary resource unit allocations in accordance with one embodiment. In one embodiment, resource unit allocation 1310 is a 160 MHz allocation and resource unit allocation 1320 is a 80+80 MHz allocation.

Figure 14:
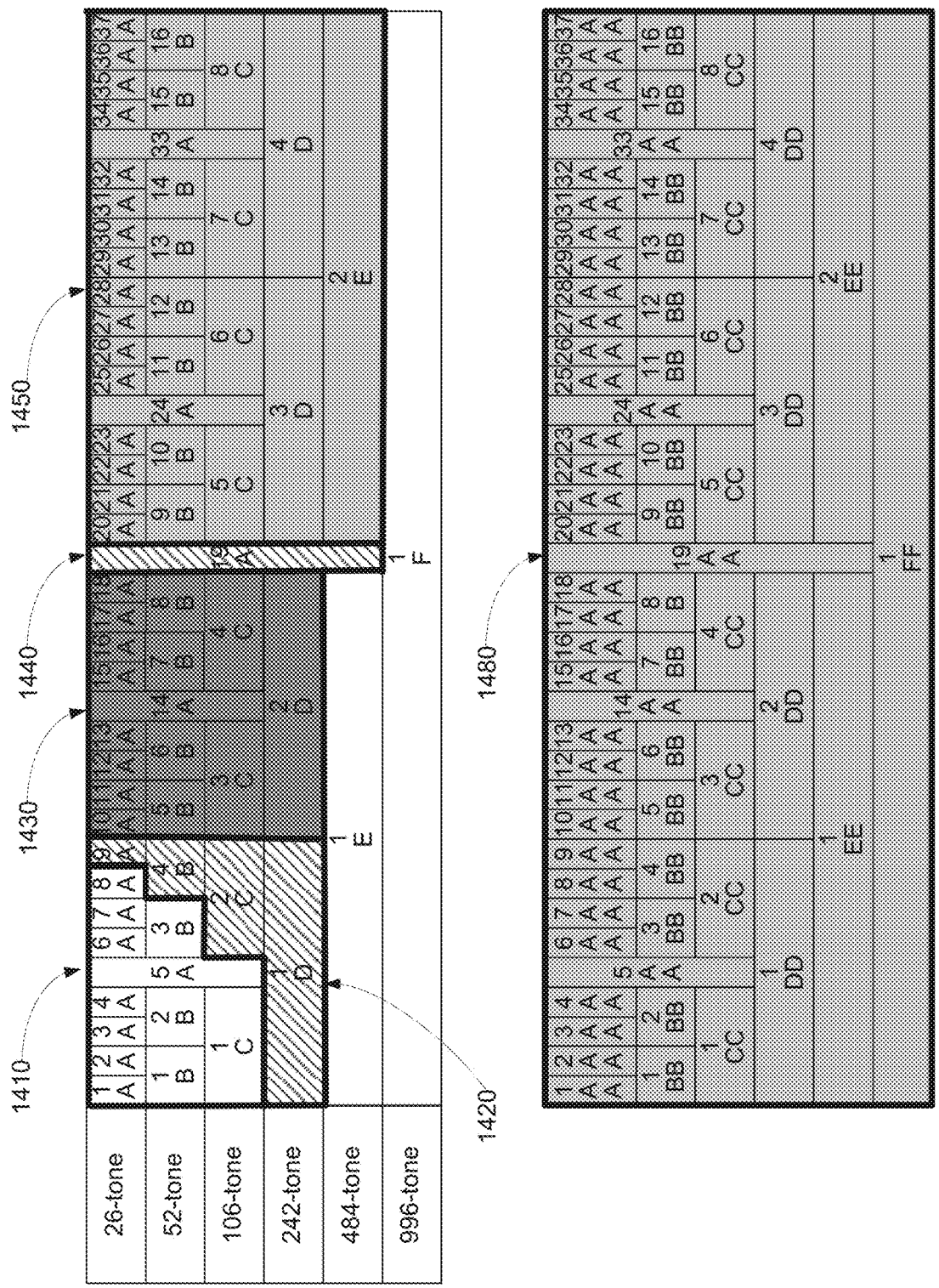
FIG. 14 is a block diagram of exemplary resource unit allocation in accordance with one embodiment.

FIG. 14 is a block diagram of exemplary resource unit allocation 1400 in accordance with one embodiment. In one embodiment, 80 MHz regions 1471 and 1472 are combined into a signal 160 Mhz allocation in resource unit allocation 1310. In one embodiment, 80 MHz regions 1371 and 1372 are similar to the 80+80 Mhz allocation in resource unit allocation 1320. Exemplary resource unit allocation 1400 includes normal sub-channel region 1410, 1450, and 1480, punctured sub-channel region 1430, and punctured side effect mitigation sub-channel regions 1420 and 1440. The punctured sub-channel region 1430 includes: RUs 10A, 11A, 12A, 13A, 14A, 15A, 16A, 17A, and 18A in the 26-tone configuration; RUs 5B, 6B, 14A, 7B, and 8B in the 52 tone configuration; RUs 3C, 14A, and 4C in the 106 tone configuration; and RU 2D in the 242 tone configuration. The normal sub-channel region 1410 includes: RUs 1A, 2A, 3A, 4A, 5A, 6A, 7A, and 8A in the 26-tone configuration; RUs 1B, 2B, 5A, and 3B in the 52 tone configuration; RUs 1C and 5A in the 106 tone configuration. The punctured side effect mitigation sub-channel region 1420 includes: RU 9A in the 26-tone configuration; RU 4B in the 52-tone configuration; RU 2C in the 106-tone configuration; and RU 1D in the 242-tone configuration. The punctured side effect mitigation sub-channel region 1440 includes RU 19A in the 26-tone configuration, RU 19A in the 52-tone configuration, RU 19A in the 106-tone configuration, RU 19A in the 242-tone configuration, and RU 19A in the 484-tone configuration. The normal sub-channel region 1450 includes: RUs 20A through 37A in the 26-tone configuration; RUs 9B through 16B, and 24A and 33A in the 52 tone configuration; RUs 5C, 23A, 6C, 7C 33A, and 8C in the 106 tone configuration; RUs 3D and 4D in the 242 tone configuration; and RU 2E in the 484 tone configuration. RU 1E in the 484-tone configuration and RU 1F in the 996-tone configuration are unused. Normal sub-channel region 1380, includes: RUs 1AA through 37AA in the 26-tone configuration; RUs 1BB through 16BB, 5A, 14AA, 19AA, 24AA, and 33AA in the 52 tone configuration; RUs 1C through 8C, 5A, 14AA, 19AA, 24AA, and 33AA in the 106 tone configuration, RUs 1DD through 4DD, and 19AA in the 242 tone configuration; and RU 1E, 19AA, and 2EE in the 484 tone configuration; and RU 1FF in the 996 tone configuration.

Figure 15:
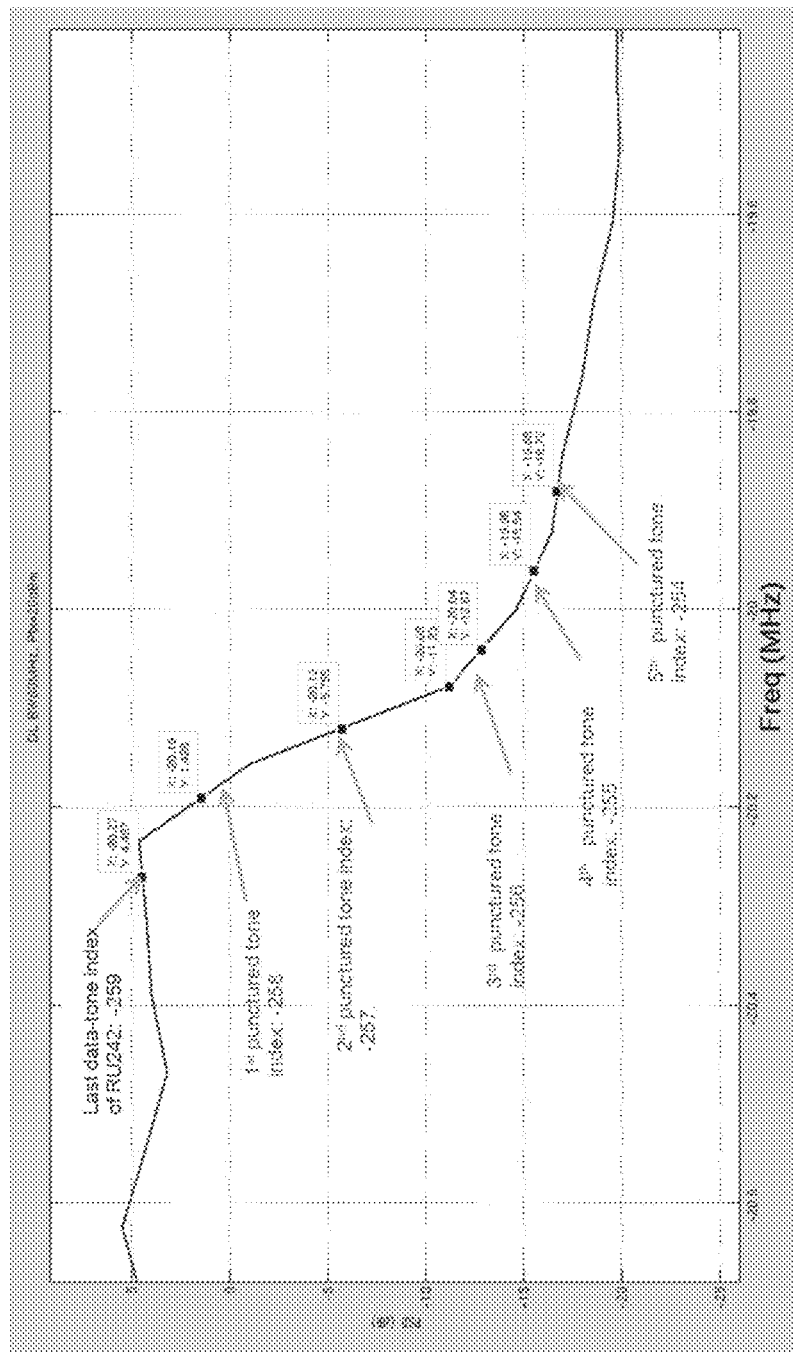
FIG. 15 is a graphical representation of an exemplary 20 dB down point is about 5 tones away in accordance with one embodiment.

In one exemplary implementation, an evaluation that includes an actual analog and RF impairment model indicates that the 20 dB down point is about 5 tones away. FIG. 15 is a graphical representation of an exemplary 20 dB down point that is about 5 tones away in accordance with one embodiment. In one embodiment, a transmit spectral mask is defined and used to mitigate/limit interference to punctured sub-channels. In one exemplary implementation, the transmit spectral mask for puncturing is defined to guarantee the interference leaking to the preamble punctured channels is 20 dB down after about 0.5 MHz away from the punctured 10 Mhz or 40 MHz channel boundary.

In one embodiment, the interference mitigation includes de-amplification or gain reduction on the sub-carriers close to the channel boundary of the preamble punctured sub-channels By reducing the transmit power at the sub-carriers close to the channel boundary, the interference leakage can be controlled to meet the transmit spectral mask defined for preamble punctured scenarios.

In one embodiment, the interference mitigation includes a digital baseband filter applied on the sub-carriers on the sub-channels. The digital baseband filter is used to reduce/constrain the interference leakage. In one exemplary embodiment, the digital baseband filter is configured in accordance with a characteristics of a transmit spectral mask. The digital baseband filtering can enable the transmit spectral mask defined for preamble punctured scenarios to be met/implemented.

Figure 16:
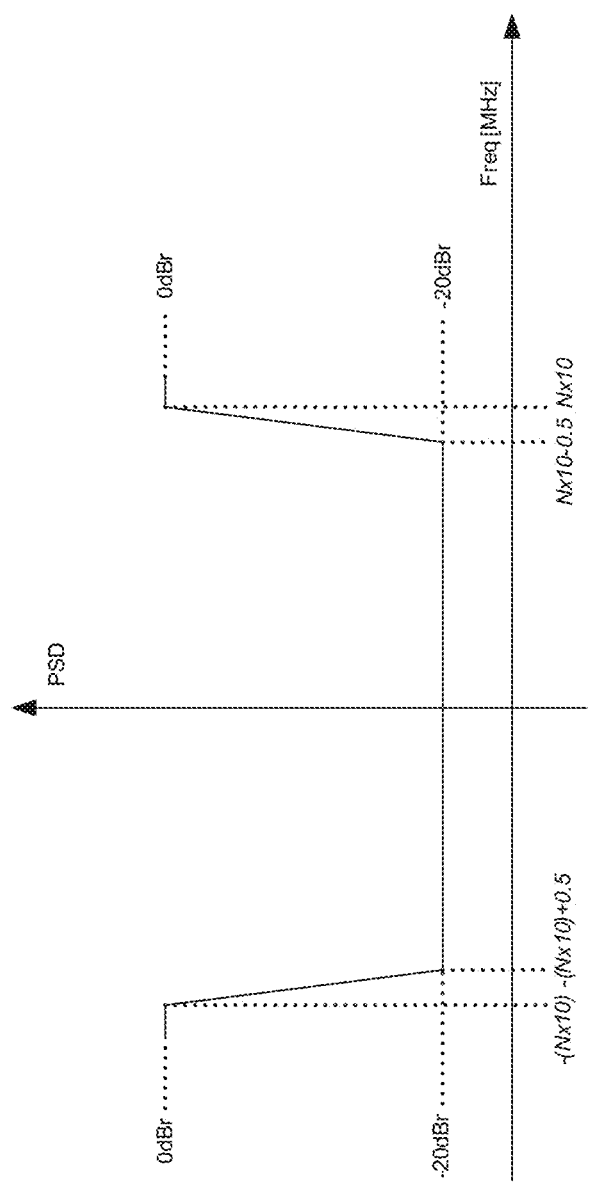
FIG. 16 is a graphical representation of an exemplary transmit spectral mask in accordance with one embodiment.

In one embodiment of a preamble puncture, the signal leakage to the preamble punctured channel from an occupied sub channel shall be less than or equal to −20 dB starting 0.5 MHz from the boundary of the preamble puncture channel. The dB can be relative to the maximum spectral design of the signal. FIG. 16 is a graphical representation of an exemplary transmit spectral mask in accordance with one embodiment. The transmit spectral mask can be for the N×20 MHz preamble puncture channel with transmissions on both upper and lower sub-channels. The variable N is the number of punctured sub-channels. The variable N can be the number of 20 MHz punctured sub-channels.

Figure 17:
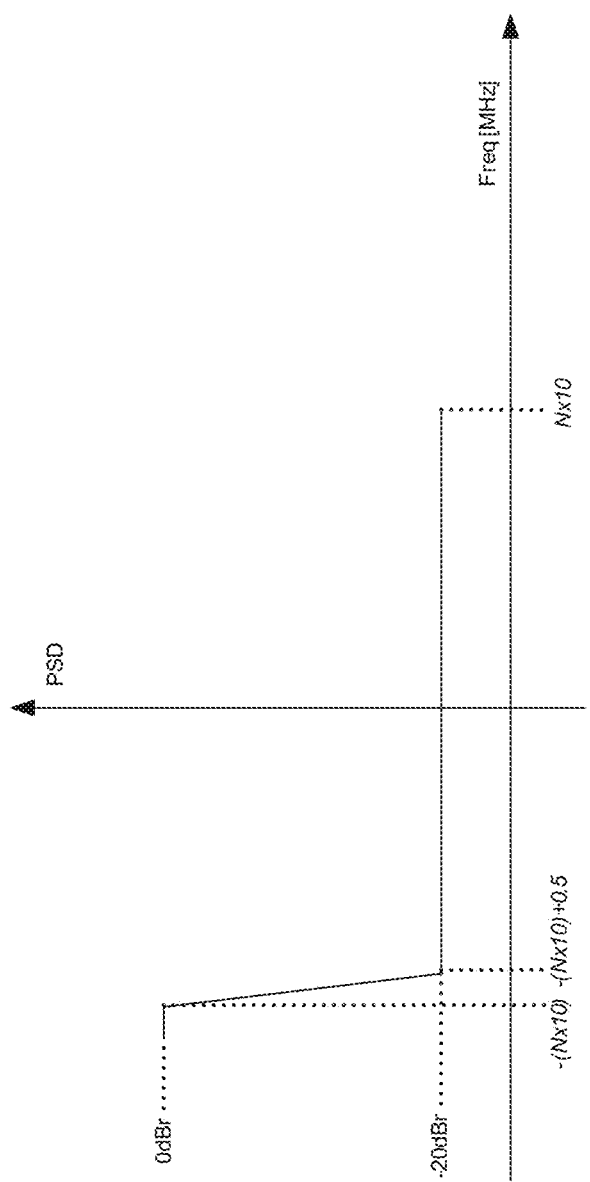
FIG. 17 is a graphical representation of an exemplary transmit spectral mask in accordance with one embodiment.

FIG. 17 is a graphical representation of an exemplary transmit spectral mask in accordance with one embodiment. The transmit spectral mask can be for the N×20 MHz preamble puncture channel with transmissions on lower sub-channels.

Figure 18:
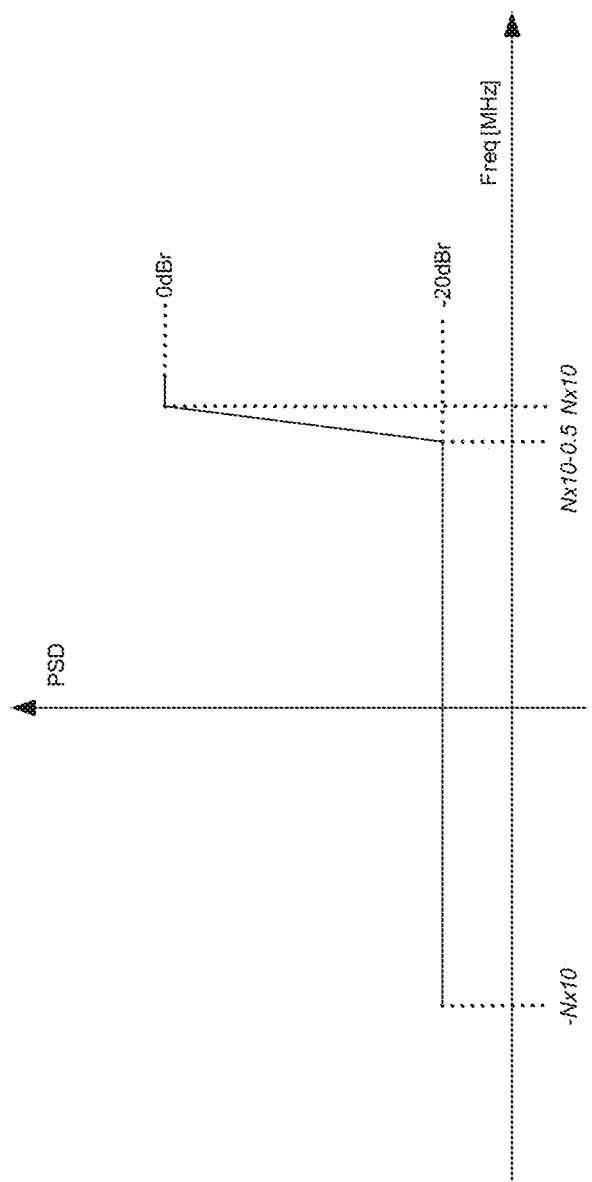
FIG. 18 is a graphical representation of an exemplary transmit spectral mask in accordance with one embodiment.

FIG. 18 is a graphical representation of an exemplary transmit spectral mask in accordance with one embodiment. The transmit spectral mask can be for the N×20 MHz preamble puncture channel with transmissions on upper sub-channels.

Figure 19:
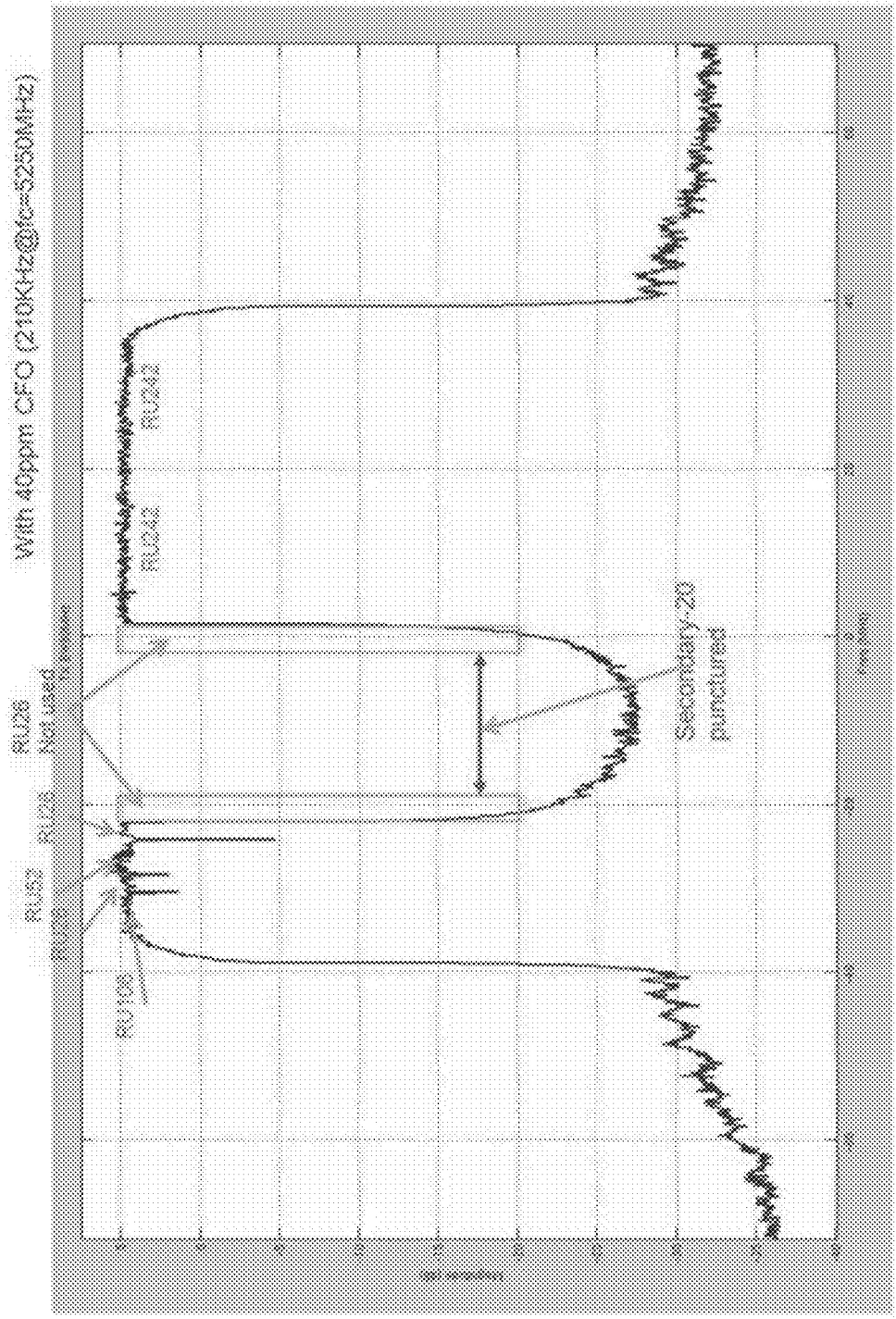
FIG. 19 is a graphical representation of an exemplary interference mitigation with an un-used 26-tone RU in accordance with one embodiment.

In one embodiment, an adjustment or alteration of a mitigation sub-channel includes avoiding or block use of an RU. The RU can be adjacent to a puncture region. In one exemplary implementation the RU is included in a punctured side effect mitigation sub-channel region. In one exemplary implementation, avoidance or block of the RU use can provide enough puncture side effect mitigation. FIG. 19 is a graphical representation of an exemplary interference with an un-used 26-tone RU. Interference can reduce more than 20 dB when it reaches the punctured 20 MHz signal.

Figure 20:
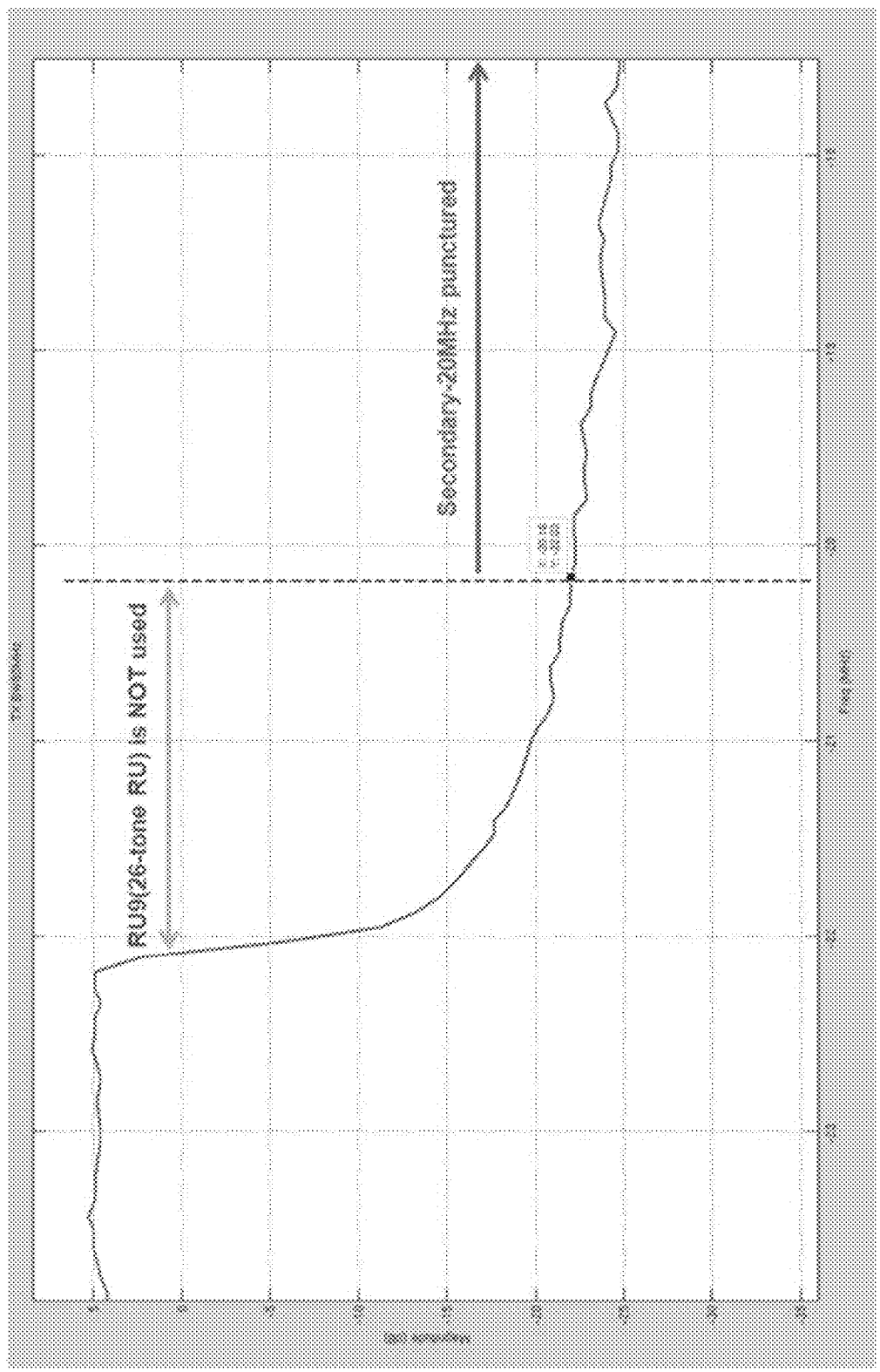
FIG. 20 is a graphical representation of puncture side effect interference in accordance with one embodiment.

FIG. 20 is a graphical representation of puncture side effect interference 1200 in accordance with one embodiment. Puncture side effect interference 1800 can be associated with a RU (e.g., in a 26-tone RU scheme, etc.) with a 40 PPM relative CFO e.g., (210 kHz @ fc=5250 MHz). As illustrated in FIG. 20, data tones in the punctured channel are affected much less by interference as compared to the example in FIG. 7. In one embodiment, for a 40 PPM relative CFO, more than 20 dB down is achieved.

In one embodiment, whether to utilize a 26 tone or 52 tone is a balancing of interference reduction and spectral efficiency. In one exemplary implementation, a 52 tone puncture mitigation scheme reduces interference more than a 26 tone puncture mitigation scheme but the 52 tone puncture mitigation scheme has less spectral efficiency than a 26 tone puncture mitigation scheme.

In one embodiment, if an AP detects that a transmission on a punctured sub-channel is a narrow band transmission, (e.g., a transmission uses less than 10 MHz, etc.) then the AP does not implement a puncture side effect mitigation scheme and can use any RUs in the non-punctured sub-channels during puncture transmission.

Figure 21:
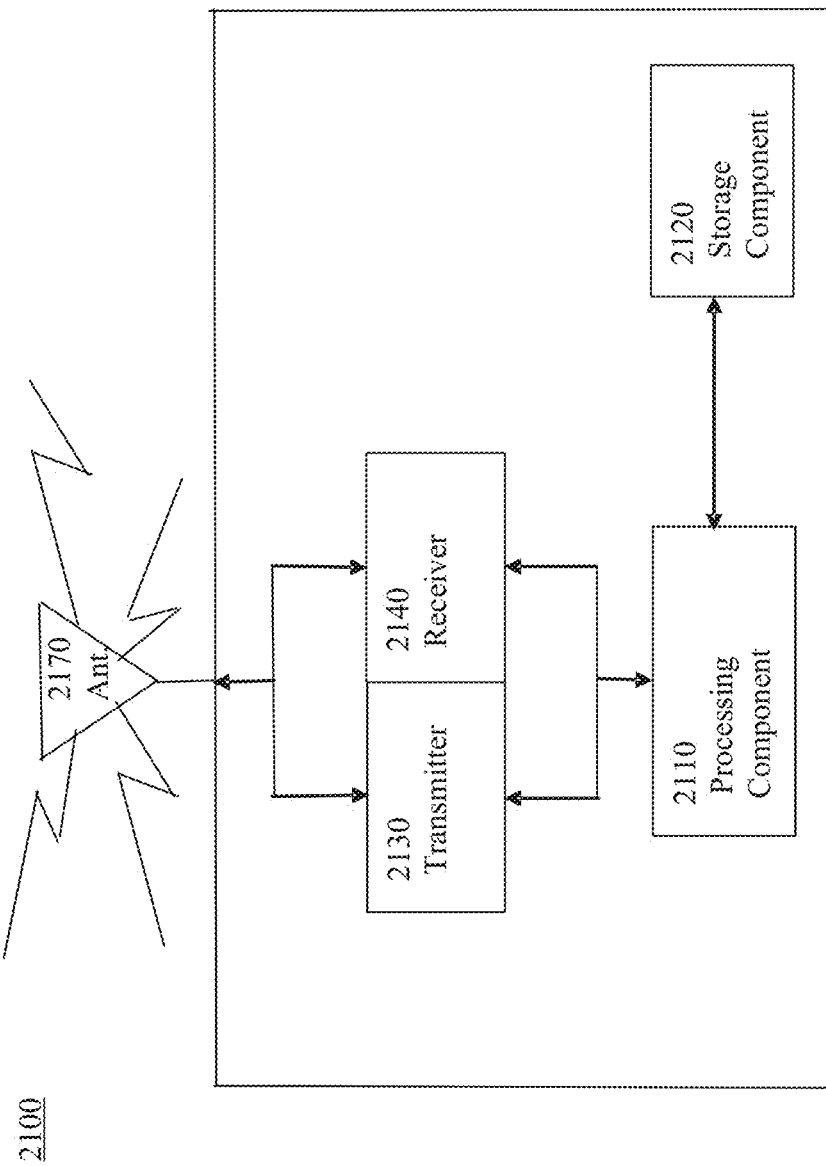
FIG. 21 is a block diagram of an exemplary station in accordance with one embodiment.

FIG. 21 is a block diagram of an exemplary station 2100 in accordance with one embodiment. Station 2100 includes processing component or circuit 2110, storage component or circuit 2120, transmitter 2130, receiver 2140, and antenna 2170. Processing component 2110 is communicatively coupled to storage component 2120, transmitter 2130, and receiver 2140. Transmitter 2130 and receiver 2140 are communicatively coupled to antenna 2170. Processing component or circuit 2110 is configurable to perform communication processes, including puncture mitigation processes. It is appreciated that processing component 2120 can be implemented in a variety of devices (e.g., processor, field programmable array (FPGA), micro-controller, etc.). Storage component 2120 is configurable to store communication information for processing component 2110, including information related to puncture mitigation processes. It is appreciated that storage component 2120 can be implemented in a variety of devices (e.g., random access memory (RAM), solid state device (SSD) memory, etc.). Transmitter 2130 is configurable to produce signals for transmission on antenna 2170, including puncture mitigation information. Receiver 2130 is configurable to receive signals from antenna 2170, including puncture mitigation information. Antenna 2170 is configurable to emit or receive signals.

In one embodiment, processing component or circuit 2110 is operable to direct a puncture mitigation process in accordance with one embodiment. In one embodiment, when an Access Point (AP) detects interference or signals in some sub-channels, the AP applies a preamble puncture and side effect mitigation process to mitigate or avoid interference to an occupied sub-channel. The processing circuit 2110 is operable to direct alteration of transmissions on a mitigation sub-channel in which a characteristic is altered to mitigate interference associated with a punctured sub-channel. The transmitter 2130 can transmit information to another station in accordance with the alteration to the mitigation sub-channel. The transmitter 2130 can be configured to transmit the mitigate side effect information to another station on a communication link. A receiver 2140 can be configured to receive signals from the other station. In one embodiment, the signals are configured in accordance with a puncture mitigation process. In one embodiment, station 2100 sends and receives the signals that are configured in accordance with a puncture mitigation scheme, increasing performance of station 2100 because it sends more information faster more accurately then just a puncture scheme without side effect mitigation.

Communicating information with less interference and corresponding errors can increase performance of station 2100. In one embodiment, when the base information or user application information communication has interference or an error, the transmitter has to expend resources and time resending the information and the receiver has to expend resources receiving the corrected information and processing it. In one sense, repetitive attempts at communications with acceptable errors can be considered re-transmission and re-processing of the base or user application information, in which the error filled initial transmission and processing adversely impact performance by consuming resources (e.g., power, occupy processing bandwidth, occupy communication bandwidth, etc.) and time.

Thus, presented embodiments provide efficient and effective interference mitigation.

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical or quantum computing device) that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as suited to the particular use contemplated. It is intended that the scope of the invention be defined by the Claims appended hereto and their equivalents. The listing of steps within method claims do not imply any particular order to performing the steps, unless explicitly stated in the claims.

What is claimed:

1. A system comprising:
a first communication device that forwards information in a communication transmission, wherein the communication transmission includes:
a normal transmission sub-channel that conveys normal information;
a punctured sub-channel that removes a first portion of information in the punctured sub-channel and conveys a second portion of information in the punctured sub-channel; and
a mitigation sub-channel in which a characteristic is altered to mitigate interference associated with the punctured sub-channel, including altering the power level of the mitigation sub-channel and transmitting a third portion of information in the mitigation sub-channel at a reduced power level that mitigates interference associated with the punctured sub-channel, wherein altering the characteristic in the mitigation sub-channel is based upon a measured characteristic of a transmission in the punctured sub-channel.

2. The system of claim 1, wherein the normal transmission sub-channel, the punctured sub-channel, and the mitigation sub-channel are included in a sub-channel scheme and the mitigation sub-channel is adjacent to the punctured sub-Channel.

3. The system of claim 1, wherein the communication transmission is configured in accordance with an Orthogonal Frequency-Division Multiple Access (OFDM A) scheme.

4. The system of claim 1, wherein the mitigation sub-channel is adjacent to the punctured sub-channel.

5. The system of claim 1, wherein an alteration of the mitigation sub-channel power level is based upon a measured signal strength of a transmission in the punctured sub-channel.

6. The system of claim 1, wherein an alteration of the mitigation sub-channel power level is based upon a measured bandwidth of a transmission in the tinctured sub-channel.

7. The system of claim 1, wherein the normal transmission sub-channel, the punctured sub-channel, and the mitigation sub-channel can include resource unit sub-channels.

8. The system of claim 1, wherein the normal transmission sub-channel, the punctured sub-channel, and the mitigation sub-channel are included in a group of 26 tone resource unit sub-channels.

9. The system of claim 1, wherein the normal transmission sub-channel, the punctured sub-channel, and the mitigation sub-channel are included in a group of 52 tone resource unit sub-channels.

10. The system of claim 1, wherein the first communication device includes a digital baseband filter applied on the mitigation sub-channel to mitigate the interference leakage and meet a transmit spectral mask defined for punctured scenarios.

11. A communication method comprising:
configuring a payload portion of information in a normal transmission sub-channel;
puncturing information in punctured sub-channel, wherein the punctured sub-channel is a preamble punctured sub-channel;
adjusting a mitigation sub-channel use to mitigate interference associated with the punctured sub-channel, wherein adjusting the mitigation sub-channel characteristic is based upon a measured characteristic of a transmission in the punctured sub-channel; and
transmitting the information in the normal transmission sub-channel, the punctured sub-channel, and the on sub-channel.

12. The communication method of claim 11, wherein adjusting the mitigation sub-channel includes de-amplification on a mitigation sub-channel close to the channel boundary of the punctured sub-channel, and the de-amplification enables control of an interference leakage in accordance with a transmit spectral mask defined for a punctured scenario.

13. The communication method of claim 12, wherein the mitigation sub-channel is adjacent to the punctured sub-channel.

14. The communication method of claim 11, wherein the normal transmission sub-channel, the punctured sub-channel, and the mitigation sub-channel are resource unit sub-channels.

15. The communication method of claim 11, wherein the adjusting includes not using the mitigation sub-channel.

16. The communication method of claim 11, wherein the information is included in a physical layer convergence procedure (PLCP) protocol data unit (PPDU).

17. The communication method of claim 11, wherein the information is transmitted on a wireless communication link.

18. The communication method of claim 17, wherein the wireless communication link is IEEE 802.11 compatible.

19. The communication method of claim 11, wherein the information comprises is transmitted in accordance with a Orthogonal Frequency-Division Multiple Access (OFDMA) scheme.

20. A communication station, comprising,
a processing circuit operable to direct alteration of transmissions on a mitigation sub-channel in which a characteristic is adjusted to mitigate interference associated with a punctured sub-channel, wherein adjusting the mitigation sub-channel characteristic is based upon a measured characteristic of a transmission in a punctured sub-channel;
a transmitter to transmit information to another station in accordance with the adjustment to the mitigation sub-channel, wherein the information includes information transmitted in a normal channel and information transmitted in punctured channel; and
a receiver to receive signals from the other station.

21. The communication station of claim 20, wherein a characteristic of the mitigation sub-channel altered to mitigate interference associated with the punctured sub-channel, including altering the power level of the mitigation sub-channel and transmitting information in the mitigation sub-channel at a reduced power level that mitigates interference associated with the punctured sub-channel.

* * * * *